United States Patent
Stepuch

(10) Patent No.: US 11,961,160 B2
(45) Date of Patent: Apr. 16, 2024

(54) METHOD OF AND APPARATUS FOR DEFINING BOUNDING BOXES

(71) Applicant: Arm Limited, Cambridge (GB)

(72) Inventor: Rafał Stepuch, Cambridge (GB)

(73) Assignee: Arm Limited, Cambridge (GB)

( * ) Notice: Subject to any disclaimer, the term of this patent is extended or adjusted under 35 U.S.C. 154(b) by 102 days.

(21) Appl. No.: 17/856,274

(22) Filed: Jul. 1, 2022

(65) Prior Publication Data

US 2024/0005444 A1 Jan. 4, 2024

(51) Int. Cl.
*G06T 1/60* (2006.01)
*G06T 1/20* (2006.01)
*G06T 11/20* (2006.01)

(52) U.S. Cl.
CPC .......... *G06T 1/60* (2013.01); *G06T 1/20* (2013.01); *G06T 11/203* (2013.01); *G06T 2210/12* (2013.01)

(58) Field of Classification Search
CPC . G06T 1/60; G06T 1/20; G06T 11/203; G06T 2210/12
See application file for complete search history.

(56) References Cited

U.S. PATENT DOCUMENTS

| 6,323,874 | B1 * | 11/2001 | Gossett | G06T 17/005 345/441 |
| 2007/0216701 | A1 * | 9/2007 | Bruderlin | G06T 19/00 345/581 |
| 2018/0189925 | A1 * | 7/2018 | Lee | G06T 1/60 |

* cited by examiner

*Primary Examiner* — Jeffery A Brier
(74) *Attorney, Agent, or Firm* — NIXON & VANDERHYE P.C.

(57) ABSTRACT

There is provided a computer-implemented method of defining bounding boxes for a primitive in a tile-based graphics processing pipeline comprising determining a part-way point on the primitive, wherein, for each pair of vertices, a part-way point is part-way between that pair of vertices, and defining a plurality of bounding boxes, wherein each bounding box intersects a part-way point. Also provided is a bounding box generation circuit comprising a part-way point calculation circuit to determine a part-way point on the primitive, wherein, for each pair of vertices, a part-way point is part-way between that pair of vertices, wherein the bounding box generation circuit to define a plurality of bounding boxes based upon the determined part-way point, wherein each bounding box intersects a part-way point. A method of defining bounding boxes for a point primitive is also provided.

28 Claims, 20 Drawing Sheets

Simple solution - single bounding box

→ 16 tiles covered

Complex solution - full calculation

→ 12 tiles covered

Proposed solution with 3 bounding boxes

→ 12 tiles covered

Figure 7A
(ABC) triangle
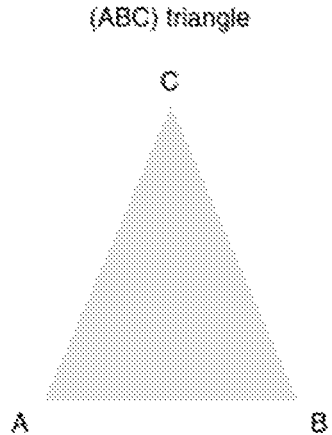
Figure 7B
(ABC) triangle with extra vertices mid-edge
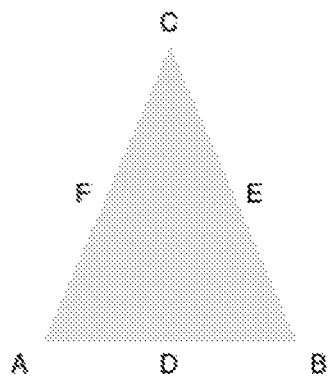
Resulting bounding boxes
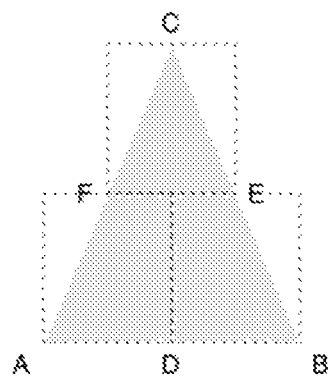
Figure 7C

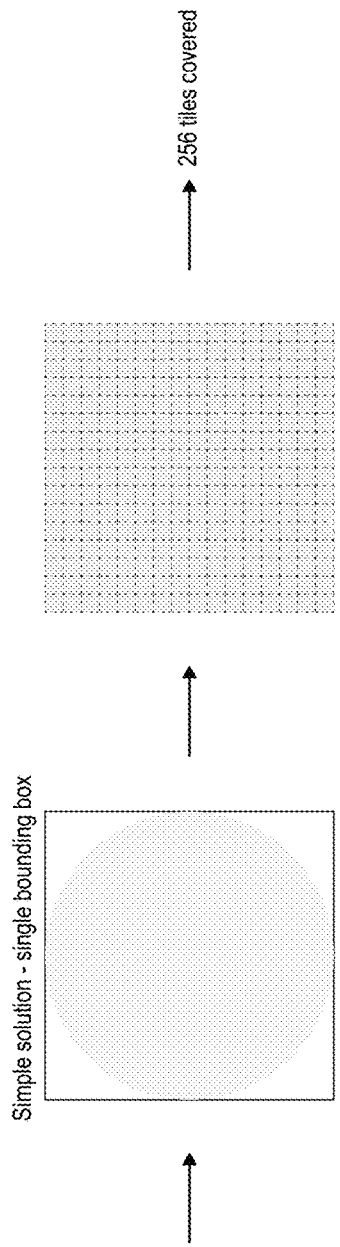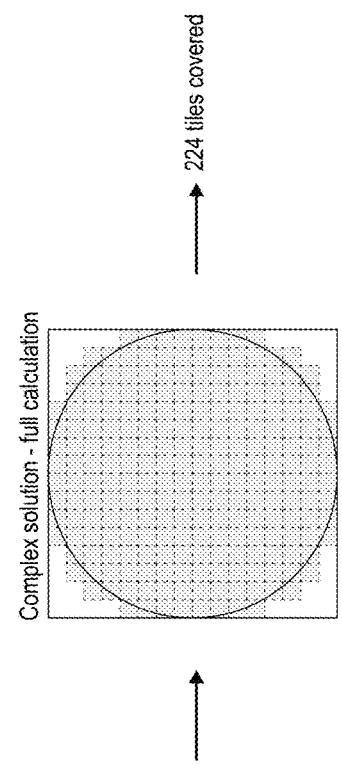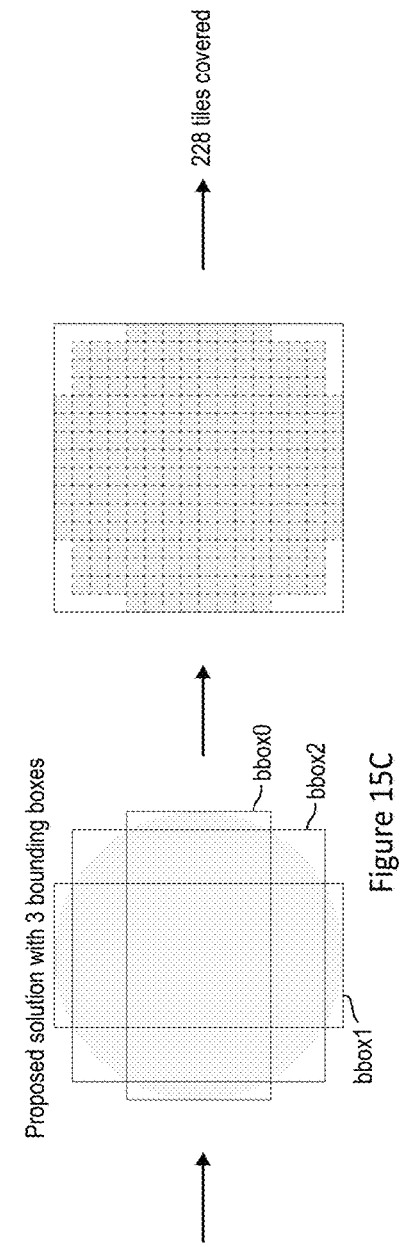

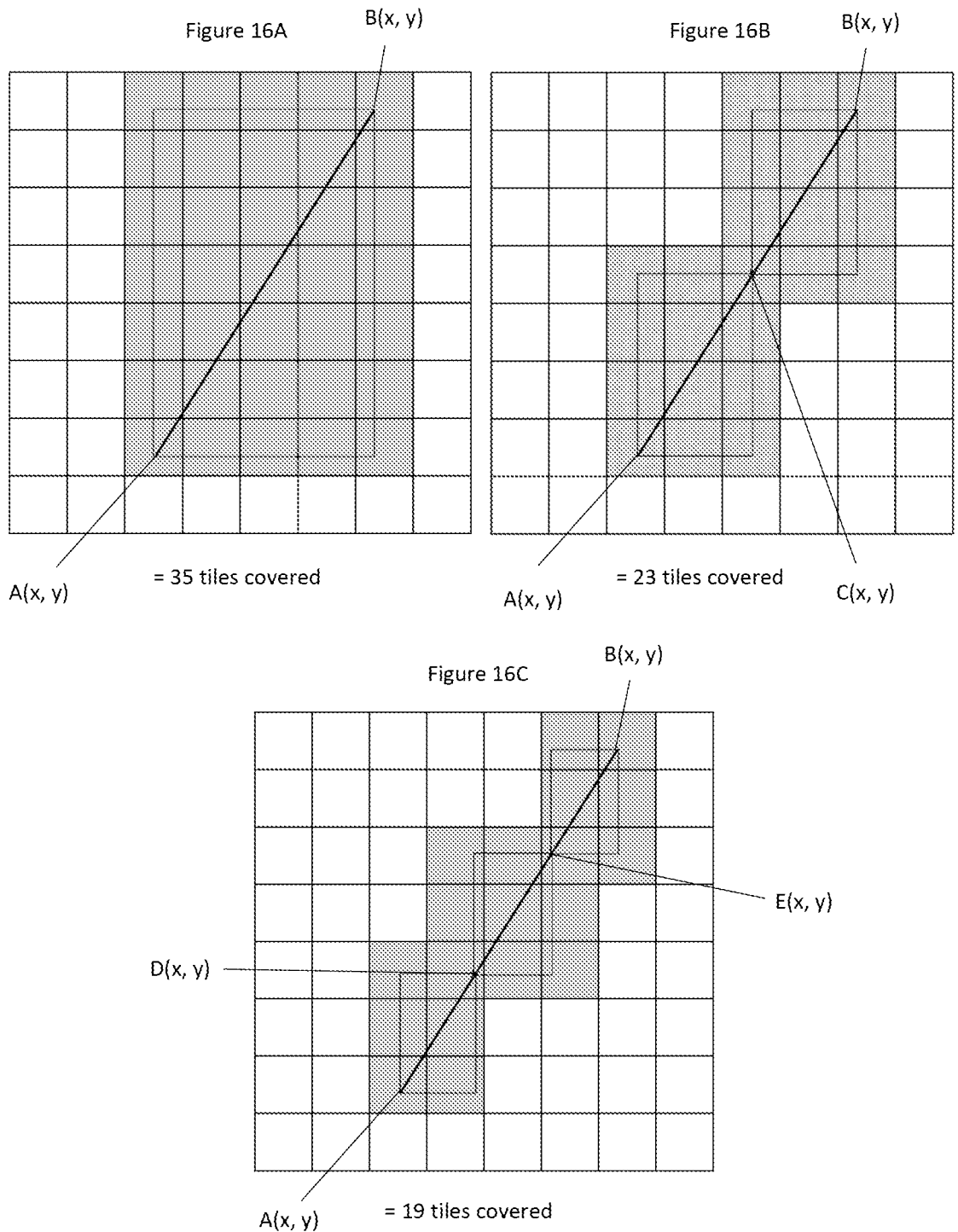

METHOD OF AND APPARATUS FOR DEFINING BOUNDING BOXES

BACKGROUND

The present disclosure relates to graphics processing, and particularly to methods of, and apparatus for, defining bounding boxes for tiling in a tiling pipeline.

Graphics processing is normally carried out by first splitting the objects in the scene to be displayed into a number of similar basic components or "primitives", which primitives are then subjected to the desired graphics processing operations. The graphics "primitives" are usually in the form of simple polygons, such as triangles and/or rectangles.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of a graphics processing unit (GPU) of a graphics processing apparatus.

Once primitives and their vertices have been generated and defined, the primitives can be processed by the graphics processing apparatus, in order, e.g., to display a frame. This processing basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

Some graphics processing apparatus use so-called "tile-based" rendering. In tile-based rendering, rather than the entire render output (e.g., frame) effectively being processed in one pass as in immediate mode rendering, the render output, e.g., a frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided (by area) into regularly-sized and shaped rendering tiles (e.g. typically squares or rectangles).

Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area sub-regions. An advantage of tile-based rendering is that primitives that do not appear in a given tile do not have to be processed for that tile, and therefore can be ignored when the tile is processed. This can allow the overall amount of graphics processing necessary for a given render output to be reduced. However, this means that in a tile-based rendering apparatus, it is accordingly usually desirable to be able to identify and know up-front those primitives that are actually present in a given tile (i.e. sub-region).

In order to facilitate this, it is known to prepare lists of the primitives to be rendered for each tile (e.g. that will appear in the tile). Such a "tile-list" (which is also often referred to as a "primitive list" or "polygon list") identifies, e.g. by reference to a primitive indicator, the primitives to be rendered for a tile in question. The process of preparing tile-lists for tiles to be rendered therefore involves determining the primitives that should be rendered for a given tile. This process is usually carried out by determining (at a desired level of accuracy) the primitives that intersect (i.e. that will appear (at least in part) within) a tile in question, and then preparing a list of those primitives for future use by the graphics processing apparatus in generating the render output. It should be noted here that where a primitive falls into more than one tile, as will frequently be the case, it is included in a tile-list for each tile that it falls within. In effect, a tile can be considered to have a bin (the tile-list) into which any primitive that should be processed for the tile is placed (and, indeed, the process of sorting the primitives on a tile basis in this manner is commonly referred to as "binning").

In a tile-based rendering apparatus, a rendering job is therefore effectively split into two distinct processing passes or stages. The first pass executes (at least) geometry related processing (e.g. vertex shading), and generates the tile-lists indicating which primitives contribute to each tile. This is normally performed by processing the data for the primitives in a pipelined fashion, e.g. by performing a series of processing steps such as obtaining the vertex data for the primitives (i.e., primitive assembly, which may include various geometry processing steps), culling, generating bounding boxes, binning, etc.

Geometry data for, and/or generated as part of this processing, is typically written into a geometry buffer until the tile-list generation is complete, and the processing can progress to the next processing step.

The second processing pass then rasterises the primitives for each tile into individual graphics fragments for processing, and executes the required fragment processing for rendering these fragments, on a tile-by-tile basis, writing the rendered tiles back to memory of the graphics processing apparatus (e.g. into a frame buffer) as they are completed.

The overall graphics processing pipeline for a tile-based graphics processing apparatus thus typically includes a geometry processing stage that takes as its input raw geometry (e.g. position and attribute) data stored in the memory system and processes that data to obtain transformed geometry (e.g. transformed position and attribute) data for the primitives making up the render output (e.g. the image to be displayed), and prepares the tile-lists. Once the tile-lists have been prepared, and written back to memory (along with the transformed geometry data), the primitives for each tile are then rasterised into individual graphics fragments for processing by the graphics processing unit (processor), with the fragments being sent to a fragment shading stage that performs the appropriate fragment processing operations on the fragments to generate the required fragment data, etc., for render output. The processed fragment data is then written into a suitable tile buffer, such that once all of the fragments to be rendered for a particular tile have been processed, the fully rendered tile can then be written back to an output frame buffer, from which it can be read out (along with the other rendered tiles once they have been processed) to generate the entire render output.

Thus, when rendering a particular output (e.g. frame) in a tile-based graphics processing apparatus, data is generated at various stages of the graphics processing pipeline that is temporarily held, e.g. in one or more associated buffers, until that data is ready to be used and passed onto the next stage of the graphics processing pipeline. This data is thus written by the graphics processing unit (GPU) into associated storage (e.g. its associated buffer), from which it can subsequently be read out as the graphics processing operation progresses. Such data is thus variously transferred between the GPU and the memory system during the graphics processing operation, with an associated memory "bandwidth" cost representing the amount of data that needs to be transferred to/from memory.

As GPUs become larger (and graphics content more complex) increasingly larger amounts of memory bandwidth are consumed by graphics processing operations. The power cost of moving such data back and forth from memory during a graphics processing operation may thus represent a sizeable portion of the overall power budget. Thus, particularly for system on chip (SoC) mobile devices, or other devices with limited bandwidth and power resource, it would be desirable to reduce the amount of memory bandwidth required.

BRIEF DESCRIPTION OF THE DRAWINGS

Various embodiments of the technology described herein will now be described, by way of example only and not in any limitative sense, with reference to the accompanying drawings, in which:

FIGS. 7A, 7B, and 7C show exemplary steps of obtaining bounding boxes for a primitive in accordance with the technology described herein;

FIGS. 15A, 15B, and 15C show methods of obtaining bounding boxes for a primitive in accordance with the technology described herein;

FIGS. 16A, 16B, and 16C show methods of obtaining bounding boxes for a primitive in accordance with the technology described herein;

DETAILED DESCRIPTION

A first embodiment of the technology described herein comprises a computer-implemented method of defining bounding boxes for a primitive in a tile-based graphics processing pipeline, the primitive comprising a plurality of vertices, the method comprising: determining at least one part-way point on the primitive, wherein, for each pair of vertices, at least one of the part-way points is part-way between that pair of vertices; and defining a plurality of bounding boxes, wherein each bounding box intersects at least one of the part-way points.

A second embodiment of the technology described herein comprises a bounding box generation circuit to determine bounding boxes for a primitive in a tile-based graphics processing pipeline, the bounding box generation circuit comprising: a part-way point calculation circuit to determine at least one part-way point on the primitive, wherein, for each pair of vertices, at least one of the part-way points is part-way between that pair of vertices, wherein the bounding box generation circuit to define a plurality of bounding boxes based upon the determined at least one part-way point, wherein each bounding box intersects at least one part-way point.

A third embodiment of the technology described herein comprises computer-implemented method of defining bounding boxes for a point primitive in a tile-based graphics processing pipeline, the method comprising: defining a first bounding box covering a first portion of the point primitive; and defining at least one further bounding box covering at least one further portion of the point primitive.

Where the term "vertex" is used herein, it should be understood to include "end-point" within its definition, such as the end-point of a line primitive, described in detail in later pages.

In scenarios such as computer graphics, where millions of primitives are being rendered and displayed every second, and large quantities of data are moving back and forth from memory, large amounts of memory bandwidth are required to maintain a high, stable framerate.

Broadly speaking, embodiments of the present invention provide more efficient—in terms of use of computational resources and electrical power—means of defining bounding boxes for use in tiling pipeline processing.

Figure 1:
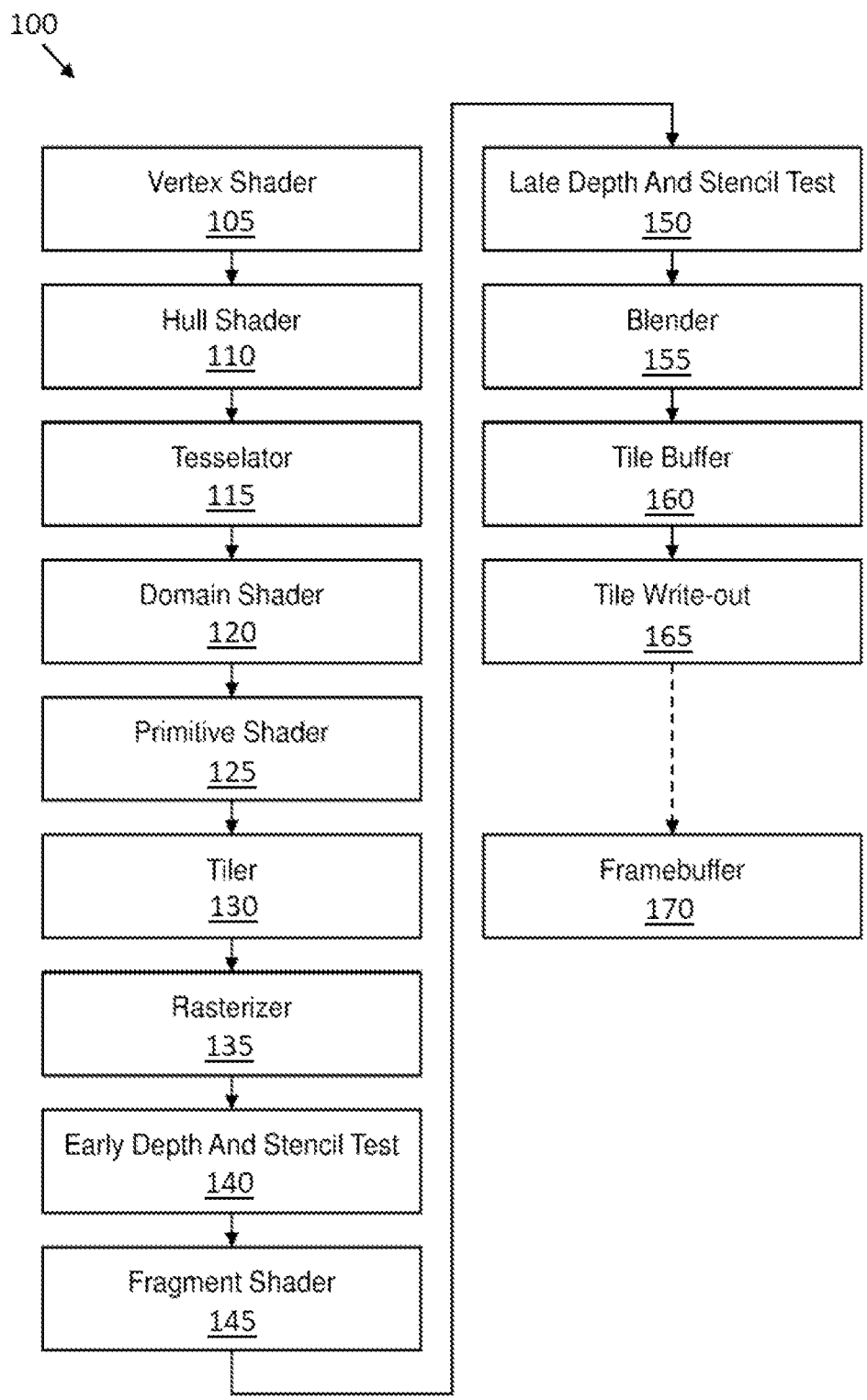
FIG. 1 shows an example graphics processing pipeline.

Referring to FIG. 1, elements and pipeline stages associated with a GPU are shown. There may be other elements and stages of the graphics processing pipeline that are not illustrated in FIG. 1. It should also be noted that FIG. 1 is schematic, and that, for example, in practice the shown elements and pipeline stages may share significant hardware circuits even though they are shown schematically as separate stages in FIG. 1.

The graphics processing pipeline S100 that the GPU executes includes a number of stages, including vertex shader 105, hull shader 110, tesselator 115, domain shader 120, geometry shader 125, tiler 130, rasterizer 135, an early Z (or 'depth') and stencil test stage 140, a renderer in the form of a fragment shading stage 145, a late Z (or 'depth') and stencil test stage 150, a blending stage 155, tile buffer 160, and a downsampling and writeout stage 165. Other arrangements for a graphics processing pipeline are, however, possible.

The vertex shader 105 receives input data values associated with the vertices defined for the output to be generated. The vertex shader 105 processes those data values to generate a set of corresponding, vertex-shaded, output data values for use by subsequent stages of the graphics processing pipeline 100.

Each primitive to be processed may be defined and represented by a set of vertices. Each vertex for a primitive may have associated with it a set of attributes. A set of attributes is a set of data values for the vertex. These attributes may include position data and other, non-position data (or 'varyings'). The non-position data may define, for example, color, light, normal and/or texture coordinates for the vertex in question.

A set of vertices is defined for given output to be generated by the GPU. The primitives to be processed for the output comprise given vertices in the set of vertices. The vertex shading operation transforms the attributes for each vertex into a desired form for subsequent graphics processing operations. This may comprise transforming vertex position attributes from the world or user space for which they are initially defined to the screen space in which the output of the graphics processing system is to be displayed. This may also comprise modifying the input data to take account of the effect of lighting in the image to be rendered.

The hull shader 110 performs operations on sets of patch control points and generates additional data known as patch constants.

The tessellation stage 115 subdivides geometry to create higher-order representations of the hull.

The domain shader 120 performs operations on vertices output by the tessellation stage, in a similar manner to the vertex shader 105.

The geometry shader 125 processes entire primitives, such as triangles, points and lines.

The vertex shader 105, hull shader 110, tesselator 115, domain shader 120, and primitive shader 125 perform the frontend operations, such as transformation and lighting operations, and primitive setup, to setup the primitives to be rendered, in response to commands and vertex data provided to the GPU.

Once all the primitives to be rendered have been appropriately set up, the tiler 130 then determines which primitives are to be processed for each tile that the render output has been divided into for processing purposes. To do this, the tiler 130 compares the location of each primitive to be processed with the tile positions, and adds the primitive to a respective primitive list for each tile that it determines the primitive could potentially fall within. Known techniques for sorting and binning primitives into tile lists include exact binning and bounding box binning and these can be used for the tiling process. In embodiments of the present technology, one or more bounding boxes are defined according to methods described below and one or more of said methods may be implemented in graphics pipeline 100 at the tiler stage 130.

Once lists of primitives to be rendered (or 'primitive lists') have been prepared for each rendering tile in this way, the primitive lists are stored for use. The primitive lists allow the system to identify which primitives are to be considered and rendered when the tile in question is rendered.

Once the tiler 130 has prepared all of the tile lists, then each tile can be rendered. To do this, each tile is processed by the graphics processing pipeline stages that follow the tiler 130.

When a given tile is being processed, each primitive that is to be processed for that tile is passed to the rasterizer 135. The rasterization stage 135 of the graphics processing pipeline 100 operates to rasterize the primitives into individual graphics fragments for processing. To do this, the rasterizer 135 rasterizes the primitives to sampling points and generates graphics fragments having appropriate positions for rendering the primitives. The fragments generated by the rasterizer 135 are then sent onwards to the rest of the pipeline 100 for processing.

The early Z and stencil test stage 140 performs a Z (or 'depth') test on fragments it receives from the rasterizer 135 to see if any fragments can be discarded (or 'culled') at this stage. To do this, the early Z and stencil test stage 140 compares the depth values of fragments issued by the rasterizer 135 with the depth values of fragments that have already been rendered. The depth values of fragments that have already been rendered are stored in a depth buffer that is part of the tile buffer 160. The comparison performed by the early Z and stencil test stage 140 is to determine whether or not the new fragments will be occluded by fragments that have already been rendered. At the same time, an early stencil test is carried out. Fragments that pass the fragment early Z and stencil test stage 140 are sent to the fragment shading stage 145. The fragment shading stage 145 performs the appropriate fragment processing operations on the fragments that pass the early Z and stencil tests to generate the appropriate rendered fragment data. This fragment processing may include any suitable fragment shading processes, such as executing fragment shader programs on the fragments to generate the appropriate fragment data, applying textures to the fragments, applying fogging or other operations to the fragments, etc. The fragment shading stage 145 may be a programmable fragment shader.

There is then a late fragment Z and stencil test stage 150, which carries out, amongst other things, an end of pipeline depth test on the shaded fragments to determine whether a rendered fragment will actually be seen in the final image. This depth test uses the Z-buffer value for the position of the fragment that is stored in the Z-buffer in the tile buffer 160 to determine whether the fragment data for the new fragments should replace the fragment data of the fragments that have already been rendered. This may involve comparing the depth values of the fragments issued by the fragment shading stage 145 with the depth values of fragments that have already been rendered, as stored in the Z buffer. This late fragment depth and stencil test stage 150 may also carry out late alpha and/or stencil tests on the fragments.

The fragments that pass the late fragment test stage 150 may then be subjected, in the blender 155, to any blending operations with fragments that are already stored in the tile buffer 160. Any other remaining operations necessary on the fragments, such as dither, etc. (not shown) are also carried out at this stage.

Finally, the output fragment data (or 'values') are written to the tile buffer 160. The output fragment data can then be output to a framebuffer 170 for display. The depth value for an output fragment is also written appropriately to a Z-buffer within the tile buffer 160. The tile buffer 160 stores color and depth buffers that store an appropriate color, etc., or Z-value, respectively, for each sampling point that the buffers represent. These buffers store an array of fragment data that represents part, in this example a tile, of the overall render output with respective sets of sample values in the buffers corresponding to respective pixels of the overall render output. For example, each 2×2 set of sample values may correspond to an output pixel, where 4× multisampling is used.

The tile buffer 160 is provided as part of random access memory (RAM) that is local to the graphics processing pipeline 100. In other words, the tile buffer 160 is provided in on-chip memory.

The data from the tile buffer 160 is input to a downsampling write out-unit 165, and then output (or 'written back') to an external memory output buffer, such as a framebuffer 170 of a display device (not shown). The display device could comprise, for example, a display comprising an array of pixels, such as a computer monitor.

The downsampling and writeout unit 165 downsamples the fragment data stored in the tile buffer 160 to the appropriate resolution for the output buffer and device, such that an array of pixel data corresponding to the pixels of the output device is generated. This results in output values in the form of pixels for output to the output buffer 170.

Once a tile of the render output has been processed and its data exported to a main memory for storage, for example to the frame buffer 170 in a main memory, the next tile is then processed, and so on, until sufficient tiles have been processed to generate the entire render output. The process is then repeated for the next render output and so on.

As can be seen from FIG. 1, the graphics processing pipeline 100 includes a number of programmable processing or "shader" stages, namely the vertex shader 105, the hull shader 110, the domain shader 120, the geometry shader 125, and the fragment shader 145. These programmable shader stages execute respective shader programs that have one or more input variables and generate sets of output variables. The shader program in question may be executed for each work item to be processed, for example for each vertex in the case of the vertex shader 105. An execution thread may be issued for each work item to be processed, and the thread then executes the instructions in the shader program to produce the desired, shaded, output data.

An application may provide shader programs to be executed using a high-level shader programming language, such as OpenGLO Shading Language (GLSL), High-level Shading Language (HLSL), Open Computing Language (OpenCL), etc. These shader programs may then be translated by a shader language compiler to binary code for the target graphics processing pipeline 100. This may include creating one or more internal, intermediate representations of the program within the compiler. The compiler may, for example, be part of a driver, with there being a special API call to cause the compiler to run. The compiler execution can thus be seen as being part of the draw call preparation done by the driver in response to API calls generated by the application.

Figure 2:
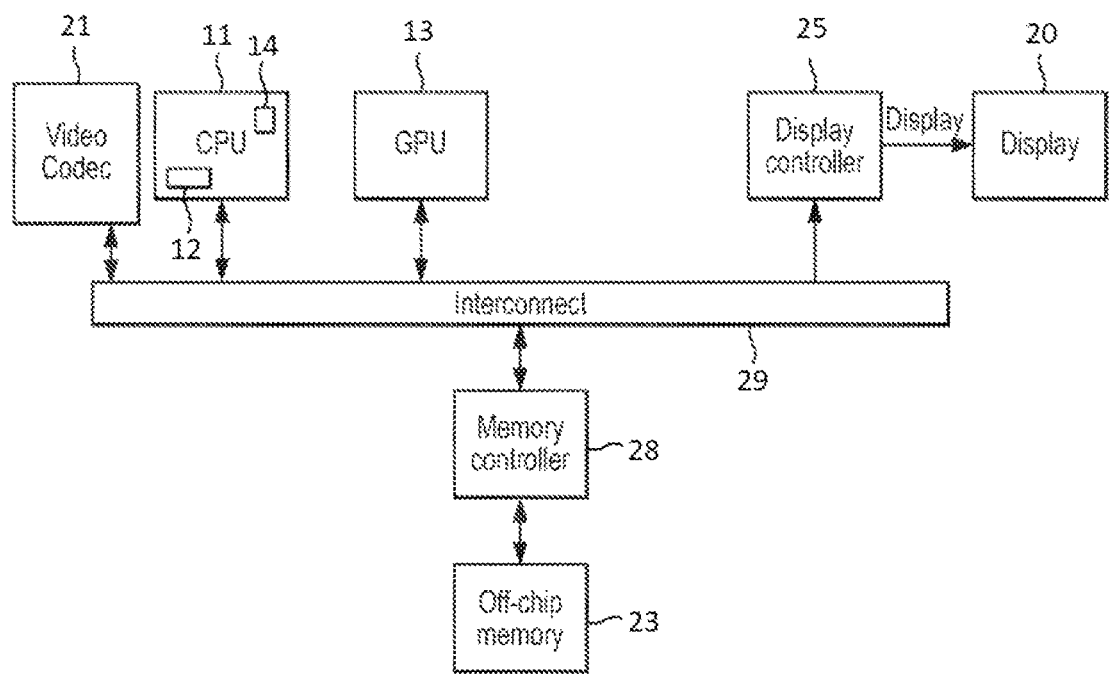
FIG. 2 shows exemplary hardware in accordance with the technology described herein.

FIG. 2 shows exemplary hardware that comprises a central processing unit (CPU) 11, a graphics processing unit (GPU) 13, a video codec 21, a display controller 25, and a memory controller 28. The GPU 13 can implement a graphics processing pipeline such as the ones shown in FIG. 1, described above, and FIG. 3, described below.

As shown in FIG. 2, these units communicate via an interconnect 29 and have access to off-chip memory 23. In this system the GPU 13, video codec 21 and/or CPU 11 generates frames to be displayed and the display controller 25 then provides the frames to a display 20 for display.

In use of this hardware, an application, such as a game, executing on the CPU 11 may require the display of frames on the display 20. To do this, the application submits appropriate commands and data to a driver 14 for the graphics processing unit 13 that is executing on the CPU 11. The driver 14 then generates appropriate commands and data to cause the graphics processing unit 13 to render appropriate frames for display and to store those frames in appropriate frame buffers, e.g. in the main memory 23. The display controller 25 then reads those frames into a buffer for the display from where they are then read out and displayed on a display panel of the display 40.

Figure 3:
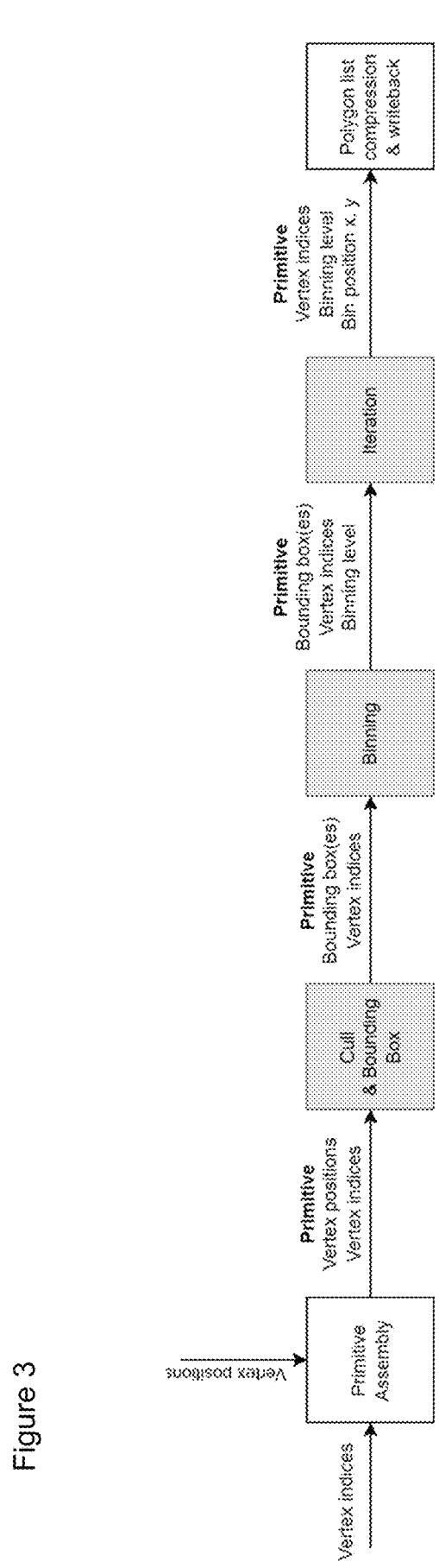
FIG. 3 shows an example tiling pipeline.

Referring to FIG. 3, a tiling pipeline, which may be a portion of a graphics pipeline such as graphics pipeline 100 described above, is shown comprising a number of stages: Primitive Assembly; Cull & Bounding Box; Binning; Iteration; and Polygon list compression & writeback. These stages may be substages of tiler stage 130 of graphics pipeline 100.

Primitive Assembly involves assembling primitives from input vertex indices and vertex positions. Cull & Bounding Box involves culling (for example, back face culling or culling primitives that do not hit sample points) and defining, in embodiments, a plurality of bounding boxes for passing to the Binning stage together with vertex indices. The Binning stage involves using a binning algorithm to determine an optimal hierarchy level, for example by calculating how many tiles are covered by the bounding boxes defined in the Cull & Bounding Box stage. The Iteration stage iterates over all bins (that is, all lists) to which the primitive data is to be written. This is performed based on the defined bounding boxes and a selected binning level. The Polygon list compression & writeback stage involves compressing data and writing the compressed data to memory for each bin that requires it.

Figure 4:
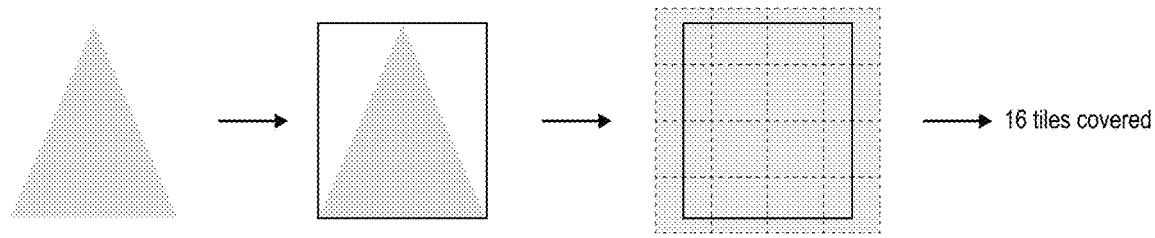
FIG. 4 shows an example bounding box.

Referring to FIG. 4, a method of obtaining a bounding box for a primitive is shown. In this example, the primitive is a triangle, and the bounding box is defined as a rectangle whose perimeter intersects the three vertices of the triangle primitive. The bounding box is overlain on or compared with an array of frame regions, or tiles, to determine in which tiles of the array the primitive lies. In the example shown, it is determined that the triangle primitive covers 16 tiles. This method is relatively straightforward and relatively computationally cheap, but overestimates the number of tiles, which can increase the amount of memory bandwidth required.

Figure 5:
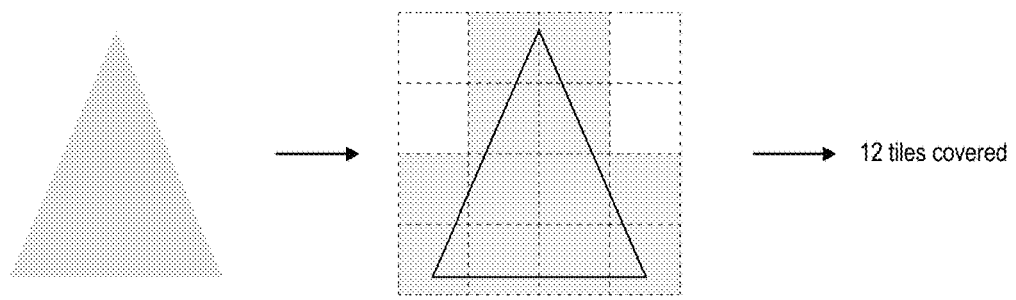
FIG. 5 shows an example of determining in which tiles a primitive lies.

Referring to FIG. 5, a method of determining in which tiles a primitive lies is shown. In this example, the primitive is the same triangle as shown in FIG. 4 and described above. However, rather than defining a bounding box for the primitive, line equations defining the edges of the triangle primitive are calculated, then, for each tile, intersections of the edges and the tile are calculated using the line equations. The tiles in which the primitive lies are derived from the calculated intersections. In the example shown, it is determined that the triangle primitive covers 12 tiles. This method is relatively complex and relatively computationally expensive, but requires less memory bandwidth once the tiles are determined.

Referring to FIGS. 6 and 7A to 7C, a method of defining bounding boxes for a primitive is shown. The method can be implemented in the Culling & Bounding Box stage of the tiling pipeline of FIG. 3. For the purposes of comparison to the methods shown in FIGS. 4 and 5 and described above, the primitive shown is the same primitive as the ones shown in FIGS. 4 and 5. In the method of FIGS. 6 and 7A to 7C, mid-points of the triangle primitive's edges are located.

Where the triangle primitive is defined with vertices {A, B, C} having respective co-ordinates {x_a, y_a; x_b, y_b; x_c, y_c}, the mid-points may be called {D, E, F}. The co-ordinates of the mid-points may be located according to the following equations:

at the mid-point halfway between vertices $A$ and $B$, where $x\_d=(x\_a+x\_b)/2$ and $y\_d=(y\_a+y\_b)/2$,     D— at the mid-point halfway between vertices $B$ and $C$, where $x\_e=(x\_b+x\_c)/2$ and $y\_e=(y\_b+y\_c)/2$, and     E— at the mid-point halfway between vertices $C$ and $A$, where $x\_f=(x\_c+x\_a)/2$ and $y\_f=(y\_c+y\_a)/2$.     F—

Having located the three mid-points {D, E, F}, three bounding boxes are then defined: one for a triangle defined by vertex A and points D and F (i.e., for triangle {A, D, F}); one for a triangle defined by vertex B and points D and E (i.e., for triangle {D, B, E}); and one for a triangle defined by vertex C and points E and F (i.e., for triangle {E, C, F}). In the example shown, the three bounding boxes are rectangles whose perimeters intersect the vertices of triangles {A, D, F}, {D, B, E}, and {E, C, F}, respectively.

Figure 6:
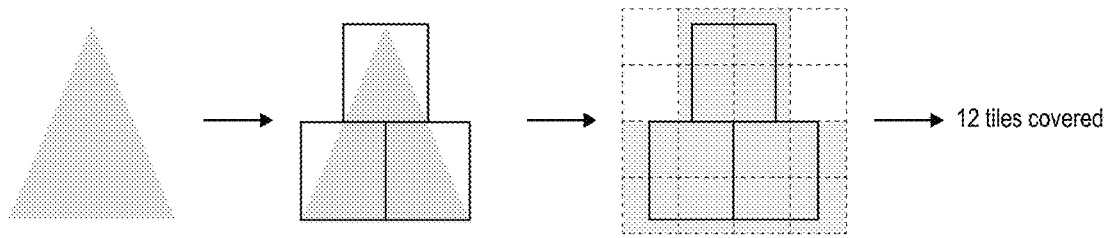
FIG. 6 shows an exemplary method of obtaining bounding boxes for a primitive in accordance with the technology described herein.

In an embodiment, having defined the three bounding boxes, the bounding boxes are passed to the Binning stage, such as that of the tiling pipeline of FIG. 3, at which the three bounding boxes are overlain on or compared with an array of tiles. In this example, for comparison purposes, the same array of tiles as those shown in FIGS. 4 and 5 is shown in FIG. 6. Where a tile contains a bounding box or a portion of a bounding box, it is determined that that tile contains the triangle primitive, or a portion of the triangle primitive, for which the three bounding boxes were defined. For the example shown in FIG. 6, it may be determined that the triangle primitive covers 12 tiles, that is, the same number of tiles as determined from the complex method shown in FIG. 5. The new method of defining the three bounding boxes, which is less computationally expensive than the line equation method, can therefore be seen to result in the same reduction in memory bandwidth required from the simple, method shown in FIG. 4, but without requiring such an increase in computational expense.

The Iteration stage then iterates over all bins based on the bounding boxes defined. In the example of FIG. 6, the Iteration stage goes over the following required bin positions:

($x=1, y=0$),($x=2, y=0$);

($x=1, y=1$),($x=2, y=1$);

($x=0, y=2$),($x=1, y=2$),($x=2, y=2$),($x=3, y=2$); and ($x=0, y=3$),($x=1, y=3$),($x=2, y=3$),($x=3, y=3$), where ($x=0$, $y=0$) denotes the top-left tile and ($x=3$, $y=3$) denotes the bottom-right tile of the third image of FIG. 6. Note that the iteration does not include bin positions ($x=0$, $y=0$), ($x=3$, $y=0$), ($x=0$, $y=1$), and ($x=3$, $y=1$), as the method of FIG. 6 defined bounding boxes which do not enclose any part of the corresponding tiles. As a consequence of increasing the number of bounding boxes defined, the Iteration stage skips the bins which are not enclosed by the bounding boxes. The result is less bandwidth usage (that is, fewer bins/lists are written out) and fewer processing cycles spent during iteration.

Figure 8:
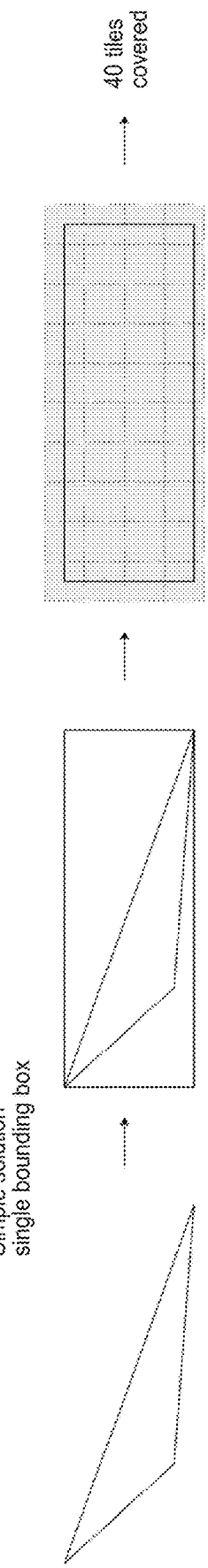
FIG. 8 shows another example bounding box of the prior art.

Referring to FIG. 8, another example of the method of FIG. 4 for obtaining a bounding box for a primitive is shown. In the example shown, it may be determined that the triangle primitive covers 40 tiles.

Figure 9:
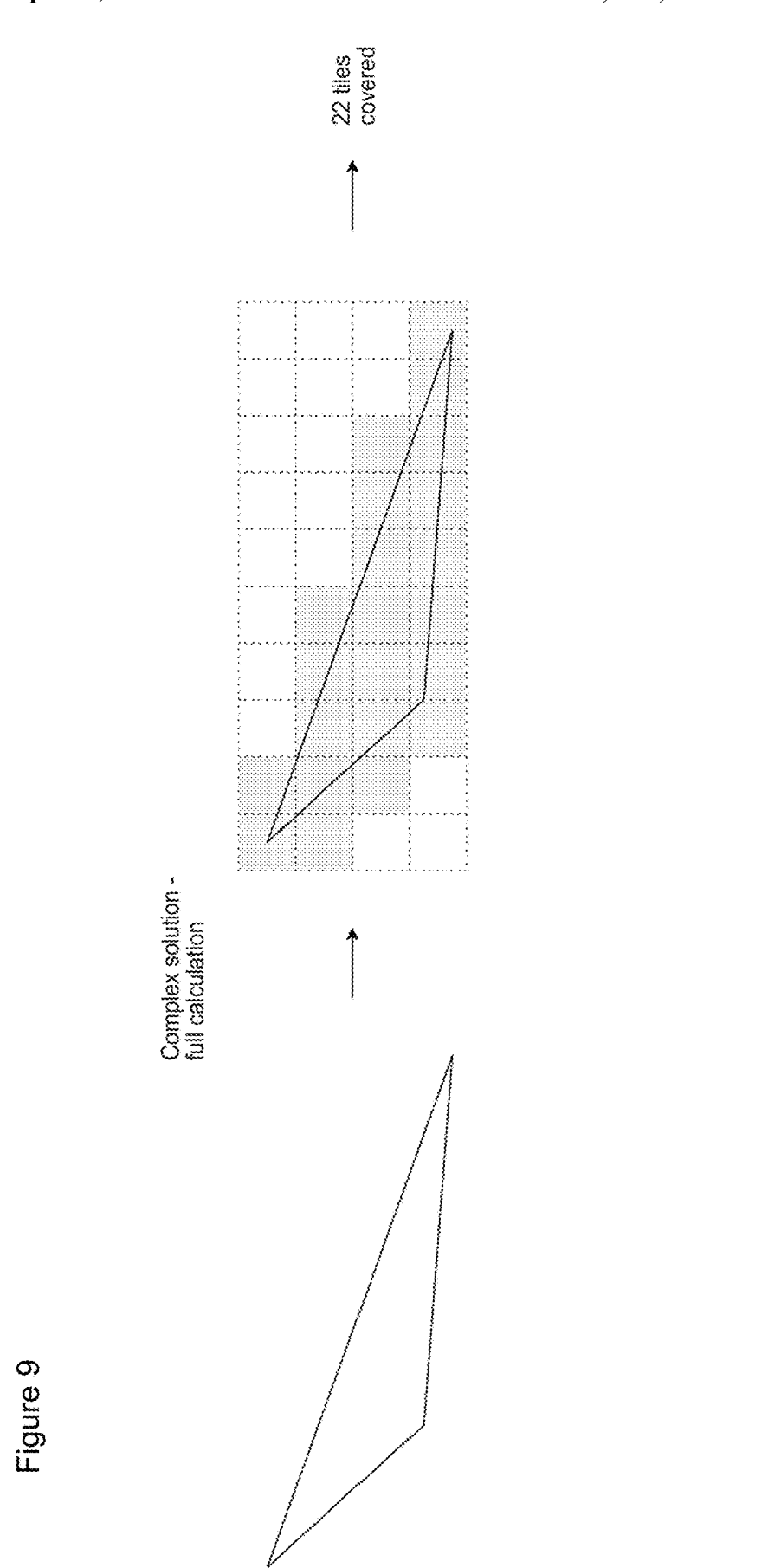
FIG. 9 shows another example of determining in which tiles a primitive lies.

Referring to FIG. 9, another example of the method of FIG. 5 for determining in which tiles a primitive lies is shown. In this example, the primitive is the same triangle as shown in FIG. 8 and described above. In the example shown, it may be determined that the triangle primitive covers 22 tiles.

Figure 10:
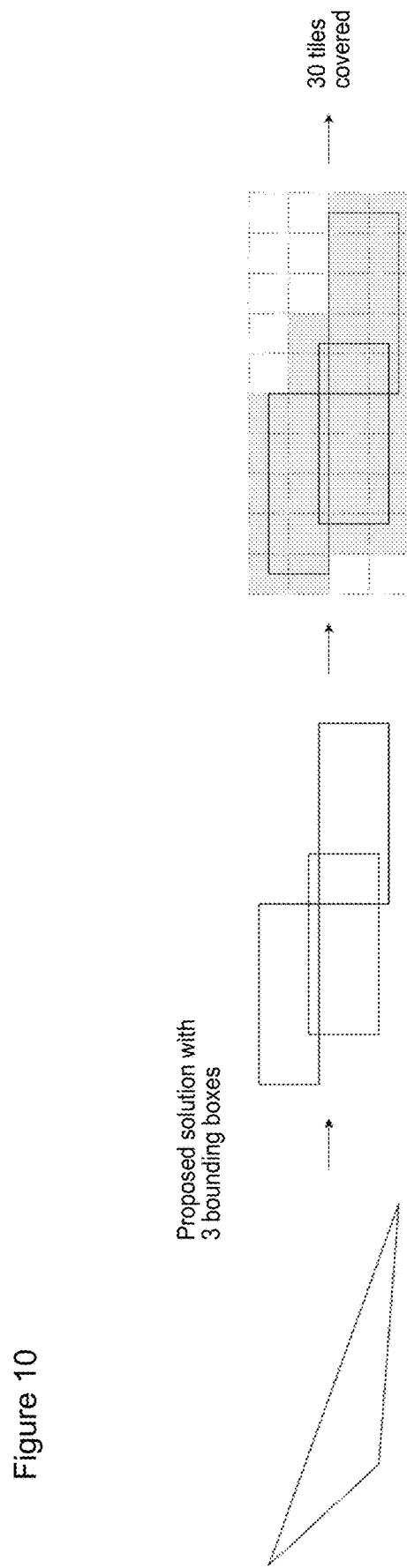
FIG. 10 shows an exemplary method of obtaining bounding boxes for a primitive in accordance with the technology described herein.

Referring to FIG. 10, another method of defining bounding boxes for a primitive is shown. The method can be implemented in the Culling & Bounding Box stage of the tiling pipeline of FIG. 3. For the purposes of comparison to the methods shown in FIGS. 8 and 9 and described above, the primitive shown is the same primitive as the ones shown in FIGS. 8 and 9. In the exemplary method of FIG. 10, mid-points of the triangle primitive's edges are located. A bounding box is defined for each triangle shape defined by a vertex and the mid-points of the two edges that join at that vertex, resulting in the three bounding boxes shown in FIG. 10. In the example shown in FIG. 10, it may be determined, such as in a Binning stage of a tiling pipeline of FIG. 3, that 30 tiles are covered; a clear reduction relative to the 40 tiles of the aforementioned method, providing a major reduction in memory bandwidth requirement for a relatively minor increase in complexity.

Figure 11:
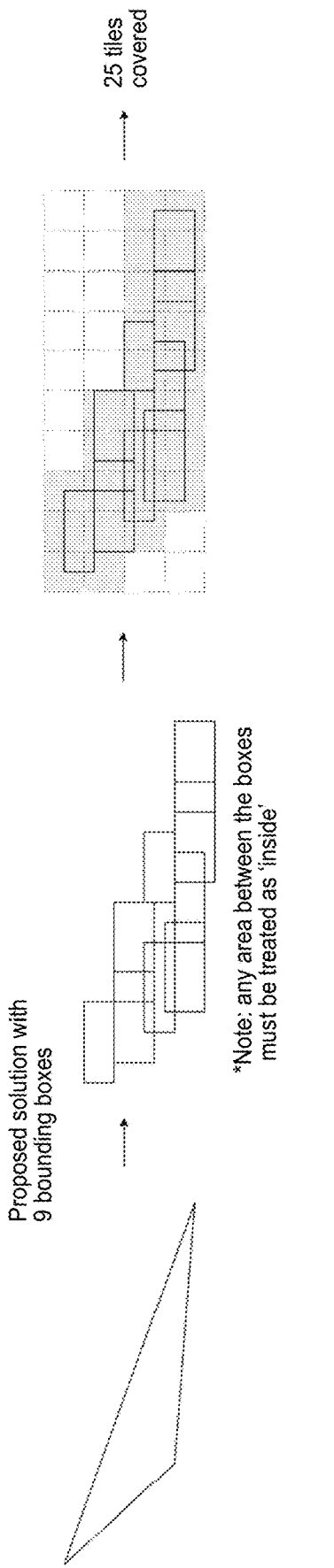
FIG. 11 shows another exemplary method of obtaining bounding boxes for a primitive in accordance with the technology described herein.

Referring to FIG. 11, another method of defining bounding boxes for a primitive is shown. The method can be implemented in the Culling & Bounding Box stage of the tiling pipeline of FIG. 3. For the purposes of comparison to the methods shown in FIGS. 8 and 9, and the method of FIG. 10, the primitive shown is the same primitive as the ones shown in those Figures. In the exemplary method of FIG. 11, nine bounding boxes are defined, resulting in a determination, such as in a Binning stage of a tiling pipeline of FIG. 3, that 25 tiles are covered; providing an even greater reduction in memory bandwidth requirement for a relatively minor increase in complexity.

A method of defining nine bounding boxes is now described with reference to FIGS. 12 and 13, which both show the same triangle primitive {A, B, C} having edge mid-points {D, E, F} and quarter-points {G, H, I, J, K, L}. The method can be implemented in the Culling & Bounding Box stage of the tiling pipeline of FIG. 3. Quarter-points are those points which are half-way between a vertex {A, B, C} and a mid-point {D, E, F}. Lines, referred to herein as mid-point joining lines, are shown connecting mid-points {D, E, F}. Mid-points {M, N, O} of lines connecting mid-points {D, E, F} are then located. Given the set of points {A-O}, the primitive {A, B, C} can be considered divided into nine triangles: {A, G, L}; {G, D, M}; {D, H, N}; {H, B, I}; {I, E, N}; {E, J, O}, {J, C, K}, {K, F, O}, and {F, L, M} wherein at least one side of each of the nine triangles is a part of an edge of the primitive. For each of the nine triangles, a bounding box is defined, resulting in nine bounding boxes. This exemplary method may include a determination, such as in a Binning stage of a tiling pipeline of FIG. 3, that the primitive of FIGS. 12 and 11 covers 77 tiles.

Figure 12:
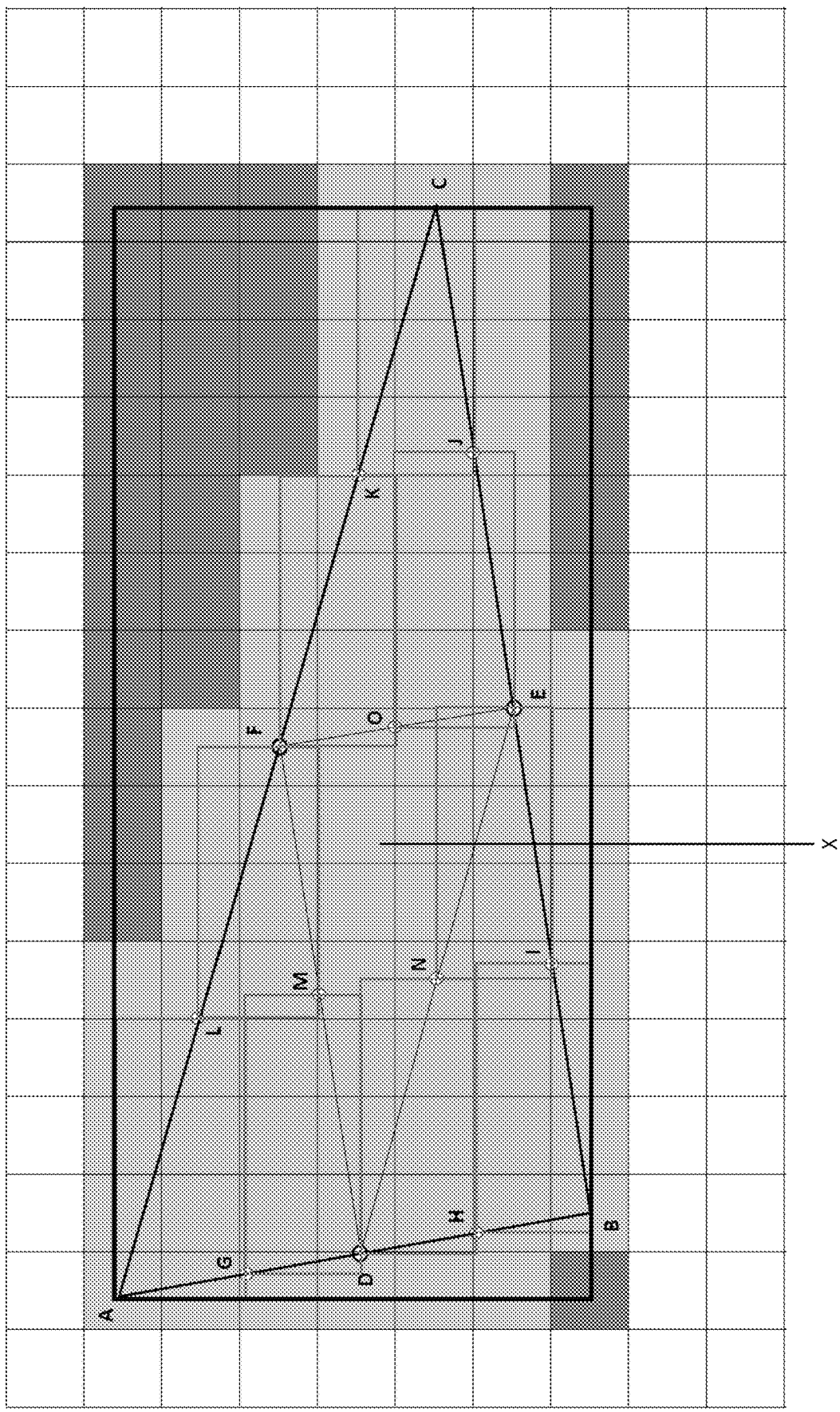
FIG. 12 shows a breakdown of an exemplary method of obtaining bounding boxes for a primitive in accordance with the technology described herein, and illustrates a comparison of tiles within the obtained bounding boxes with tiles within a bounding box of the prior art.

Referring to FIG. 12, a comparison is shown between the determination of 77 tiles to a determination made by the method of a single bounding box around the primitive. The single bounding box method results in a determination of 105 tiles covered, which demonstrates a significant improvement over this method in tile determination by the method of the present embodiment described above for a relatively minor increase in complexity.

Figure 13:
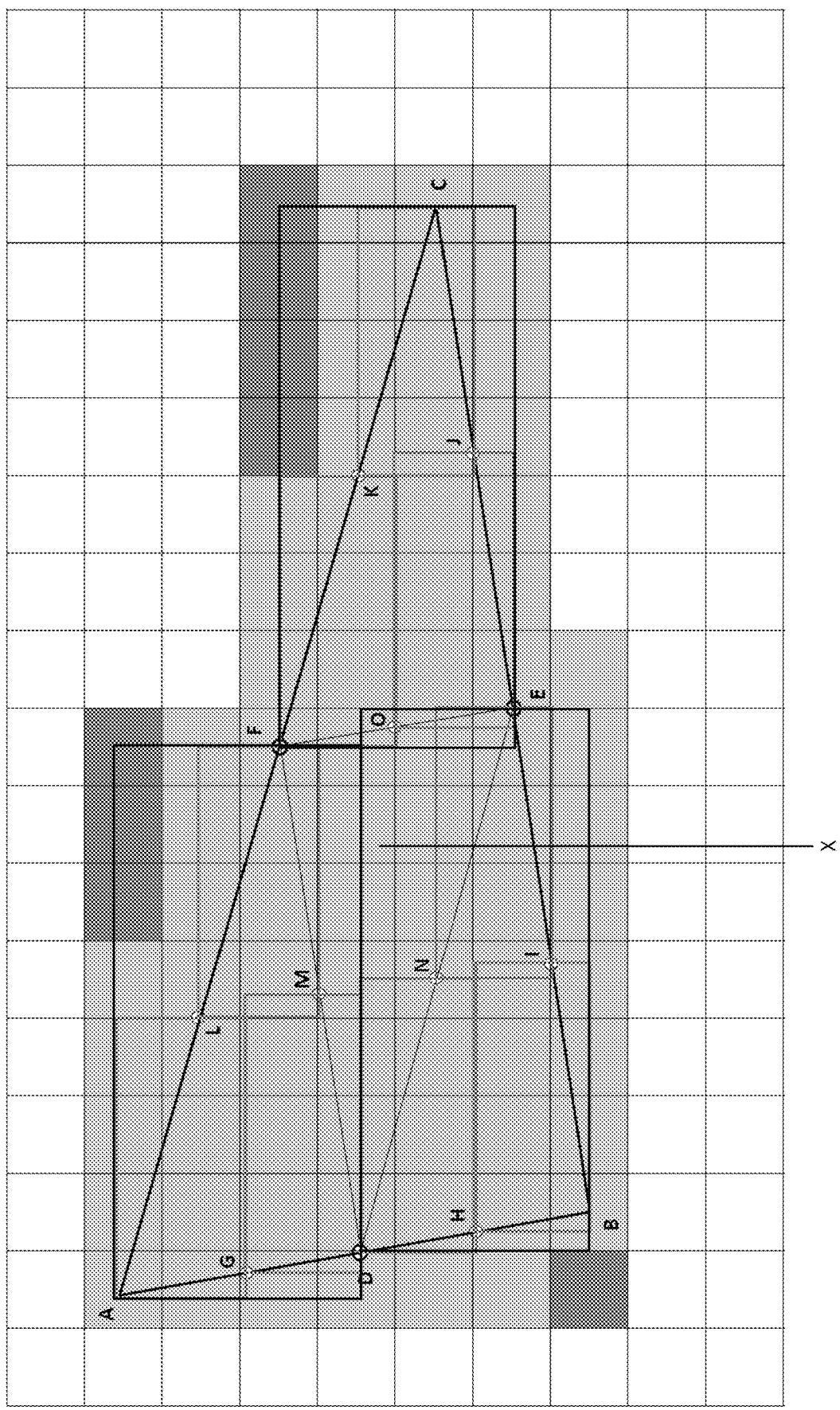
FIG. 13 shows breakdowns of two exemplary methods of obtaining bounding boxes for a primitive in accordance with the technology described herein, and illustrates a comparison of tiles within the bounding boxes obtained by the two exemplary methods.
Figure 14:
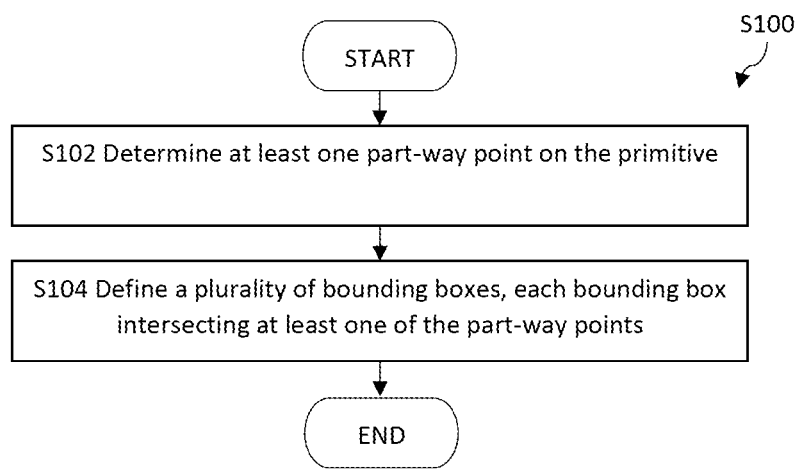
FIG. 14 shows a flowchart containing steps of an exemplary method of the technology described herein.

Referring to FIG. 13, a comparison is shown between the determination of 77 tiles to a determination made by the method of calculating line equations for the edges of the primitive and where the lines intersect tiles. The line equation method results in a determination of 69 tiles covered, which demonstrates that the much simpler and less computationally expensive method of the present embodiment can achieve almost the same reduction in memory bandwidth requirement as the line equation method.

In the exemplary embodiments of FIGS. 12 and 13, it is noted that any tiles which may be found to fall within the bounds of the primitive but which do not contain any part of a bounding box, such as those in areas labelled X, may be considered and handled in the tiling pipeline in the same way as tiles that do contain a part of a bounding box. Additionally, or alternatively, the Iteration stage may be adapted to handles such regions, as follows:

The iteration may be done linearly, that is, starting from the lowest x, y bounding box coordinates, then incrementing the x-coordinate until a max-x x-coordinate is reached, then moving to the next line by incrementing y+1. With a single bounding box, the start and end of each line are constant, but with a plurality of bounding boxes, a calculation is performed for each line. A starting y-coordinate is calculated as the lowest y-min y-coordinate of all the bounding boxes. An end-y y-coordinate is calculated as the highest y-max y-coordinate of all the bounding boxes. Then, at the start of each line, the start and end x-coordinates are calculated. A start x-coordinate is calculated as the min-x x-coordinate of all the bounding boxes at the current y position (that is, the current line). An end-x x-coordinate is calculated as the max-x x-coordinate of all the bounding boxes at the current y position (that is, the current line). This iteration adaptation ensures that tiles in such regions as region X of FIGS. 12 and 13 are iterated over.

In the above-described exemplary embodiments, reference is made to "mid-points" and "quarter-points" as being points determined to be halfway along on an edge of a primitive between two vertices and points determined to be halfway between a vertex and a mid-point, respectively. In embodiments, the methods above may be extended to eighth-points, sixteenth-points and so on in powers of two. Mid-points, quarter-points, and so on are all points which are part-way between vertices of a primitive, and therefore are herein referred to as "part-way points".

Referring to FIG. 16, steps of a method 100 embodying the present technology are shown in flow-chart form. The method begins with a determination step S102 of determining three points on a primitive. At least one of the three points is a part-way point, which as described above is part-way between two vertices, and may be a mid-point, a quarter-point, or a point at any predetermined distance along an edge of the primitive.

The method continues with a defining step S104 of defining a plurality of bounding boxes, where each bounding box intersects at least one of the part-way points. The end result is a plurality of bounding boxes encompassing the primitive. The method then ends.

This method may take place in Cull & Bounding Box stage of the tiling pipeline of FIG. 3.

In an embodiment, the method may continue, to determine which frame regions (tiles) of an image frame contain at least a portion of at least one defined bounding box. This part of the method may take place in the Binning stage of the tiling pipeline of FIG. 3.

Referring to FIGS. 15A-15C, two known methods of obtaining a bounding box for a point primitive, or circle, are shown, and a method according to an embodiment for obtaining multiple bounding boxes for a point primitive is also shown for comparison.

In the first known case of FIG. 15A (much like that shown in FIG. 4) the bounding box is defined as a rectangle whose perimeter encompasses the point primitive. In the example shown, it is determined that the triangle primitive covers 256 tiles. This method is relatively straightforward and relatively computationally cheap, but overestimates the number of tiles, which can increase the amount of memory bandwidth required.

In the second known case of FIG. 15B (much like that shown in FIG. 5) an equation defining the point primitive is calculated, then, for each tile, intersections of the edge of the point primitive and the tile are calculated using the equation. The tiles in which the primitive lies are derived from the calculated intersections. In the example shown, it is determined that the point primitive covers 224 tiles. This method is relatively complex and relatively computationally expensive, but requires less memory bandwidth once the tiles are determined.

In the third method shown of FIG. 15C three bounding boxes are defined. The point primitive may be described as having an (x, y) position and a size. The three bounding boxes, denoted bbox0, bbox1, and bbox2, of this embodiment may therefore be defined as three rectangles, each having respective (xmin, ymin) and (xmax, ymax) co-ordinates, as follows: bbox0: xmin=x−size/4; ymin=y−size/2; xmax=x+size/4; ymax=y+size/2; bbox1: xmin=x−size/2; ymin=y−size/4; xmax=x+size/2; ymax=y+size/4; and bbox2: xmin=x−size/2+size/16; ymin=y−size/2+size/16; xmax=x+size/2−size/16, ymax=y+size/2−size/16. By this new method it is determined that the three bounding boxes cover 228 tiles, which is almost as accurate as the second known method and requires much fewer computing resources.

Referring to FIGS. 16A-16C, three methods are shown for defining bounding boxes for a line primitive. A line primitive may be defined by co-ordinates of its two end-points A(x,y), B(x,y) and its width. A single bounding box around the line primitive shown in FIG. 16A is given by xmin=x0−width/2, ymin=y0−width/2, xmax=x1+width/2; ymax=y1+width/2, where (x0, y0)=min(A(x, y), B(x, y)), (x1, y1)=max(A(x, y), B(x, y)). In the example shown, it is determined that the primitive covers 35 tiles.

To define two bounding boxes, such as the two bounding boxes shown in FIG. 16B, a co-ordinate C lying on the line primitive is defined. An example of C(x, y) is C(x, y)=(A(x, y)+B(x, y))/2, where C is then a mid-point. The two bounding boxes are then defined for region A-C and for region B-C, respectively. The invention is not limited in this respect, and C may instead be elsewhere on the line primitive. In the example shown, it is determined that the primitive covers 23 tiles. Therefore, for a slight increase in computational resource use, a significant increase in accuracy is achieved.

To define three bounding boxes, such as the three bounding boxes shown in FIG. 16C, co-ordinates D and E lying on the line primitive are defined. An example of D(x, y) is D(x, y)=(A(x, y)+B(x, y))/4, and an example of E(x, y) is E(x, y)=3(A(x, y)+B(x, y))/4. The three bounding boxes are then defined for region A-D, region D-E, and region E-C, respectively. The invention is not limited in this respect, and D and E may instead be elsewhere on the line primitive rather than at equal thirds. In the example shown, it is determined that the primitive covers 19 tiles. Therefore, for a slight increase again in computational resource use relative to the method of FIG. 16B, a further increase in accuracy is achieved.

Referring to FIGS. 17 to 29, embodiments of the present technology relating to bounding box generation circuits will now be described. It should be noted that the term "bounding box generation circuit" is intended to refer to a circuit which includes one or more of the circuits described below, including, but not limited to, one or more bounding box calculation circuits, one or more comparing elements, one or more multiplexing elements, and/or one or more part-way point calculation circuits.

Figure 17:
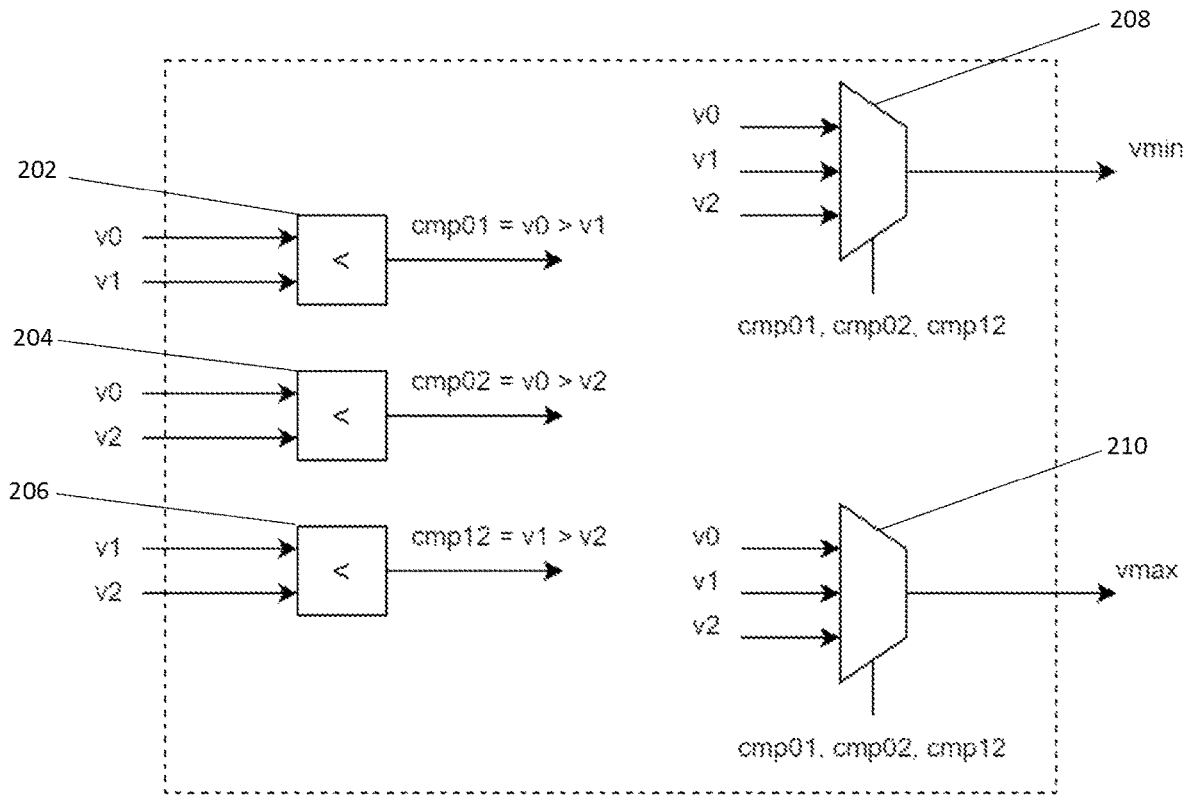
FIG. 17 is a schematic drawing of parts of a bounding box generation circuit in accordance with the technology described herein.

FIG. 17 shows three comparing elements (202, 204, 206) which each compare two inputs (v0 and v1, v0 and v2, and v1 and v2) and output a comparing value (cmp01, cmp02, and cmp12) indicating which of the two inputs the element compared is the higher. One or more of the comparing elements (202, 204, 206) may comprise a comparator.

FIG. 17 also shows two multiplexing elements (208, 210) which each take 6 inputs (v0, v1, v2, cmp01, cmp02, and cmp12). One multiplexing element (208) outputs the smallest (vmin) of the first three inputs (v0, v1, and v2) using the second three comparing values (cmp01, cmp02, and cmp12), and the other multiplexing element (210) outputs the largest (vmax) of the first three inputs (v0, v1, and v2) using the second three comparing values (cmp01, cmp 02, and cmp12). One or more of the multiplexing elements (208, 210) may comprise a multiplexor.

In embodiments, the comparing elements (202, 204, 206) take pairs x- or y-coordinates as inputs, compare the coordinate values to determine which of each pair is larger (or smaller), pass the determined values to the multiplexing elements (208, 210), and the multiplexing elements (208, 210) take all of the coordinates and use the determined values to output the maximum value of the coordinates and the minimum value of the coordinates.

Figure 18:
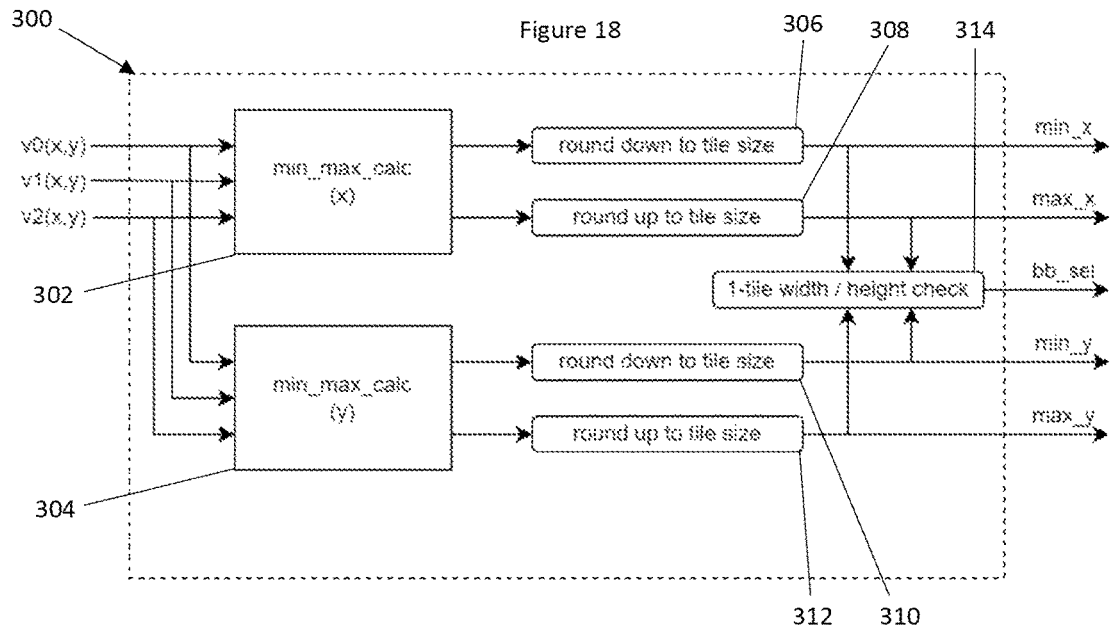
FIG. 18 is a schematic drawing of parts of a bounding box generation circuit in accordance with the technology described herein.

FIG. 18 shows a bounding box calculation circuit (300) comprising two calculating elements referred to herein as min-max circuits (302, 304), each taking as inputs values v0, v1, and v2 which, in embodiments, are x-y coordinates of vertices or end-points of a primitive. One min-max circuit, referred to herein as the x-min-max circuit (302), determines and outputs minimum (min_x) and maximum (max_x) values of x-coordinates. The other min-max circuit, referred to herein as the y-min-max circuit (304), determines minimum (min_y) and maximum (max_y) values of y-coordinates. One or more of the min-max circuits may include comparing elements and multiplexing elements such as those described above with reference to FIG. 17.

The bounding box calculation circuit (300) of FIG. 18 also comprises four rounding elements (306, 308, 310, 312). Two of the rounding elements, referred to herein as x-rounding elements (306, 308), receive inputs from the outputs of the x-min-max circuit (302) and another two of the rounding elements, referred to herein as y-rounding elements (310, 312), receive inputs from the outputs of the y-min-max circuit (304). One of the x-rounding elements (308) determines in which tile a maximum x-coordinate lies and rounds the tile number of the determined tile up to the next tile number to obtain rounded maximum value max_x. The other of the x-rounding elements (306) determines in which tile a minimum x-coordinate lies, the tile number of that determined tile being a rounded minimum value min_x. One of the g-rounding elements (312) determines in which tile a maximum y-coordinate lies and rounds the tile number of the determined tile up to the next tile number to obtain rounded maximum value max_y. The other of the y-rounding elements (310) determines in which tile a minimum y-coordinate lies, the tile number of that determined tile being a rounded minimum value min_y.

For example, a minimum x-coordinate is 18.6, a minimum y-coordinate is 17.8, a maximum x-coordinate is 90, a maximum y-coordinate is 110.12. and the tile sizes are 16×16 pixels. In an embodiment, the rounding "pulls" diametrically opposite corners of the bounding box that the minimum and maximum coordinates define outward to meet the corners of the tiles in which the corners each lie, thereby defining a "rounded" bounding box whose perimeter encompasses an integer number of tiles. In an embodiment, the maximum x-coordinate and maximum y-coordinate may be rounded up to values shy of respective tile edges, such as to 111.9, or to 111.99, and so on where the tile edge is at 112.

For instance, if the tile size is 16×16, the rounding is done upwards/downwards to the nearest 16. The coordinates obtained, namely {min_x, min_y} and {max_x, max_y} define opposite corners of a bounding box bounding a primitive whose vertex coordinates were passed into the bounding box calculation circuit (300).

The bounding box calculation circuit (300) of FIG. 18 also comprises a checking element (314) which, in an embodiment, takes as inputs the outputs of all four rounding elements (306, 308, 310, 312). The checking element (314) checks whether the {min_x, min_y} and {max_x, max_y} coordinates lie within a single tile and outputs an indication signal (bb_sel) to indicate that further stages of a pipeline may be disabled to save unnecessary computational expense.

Figure 19:
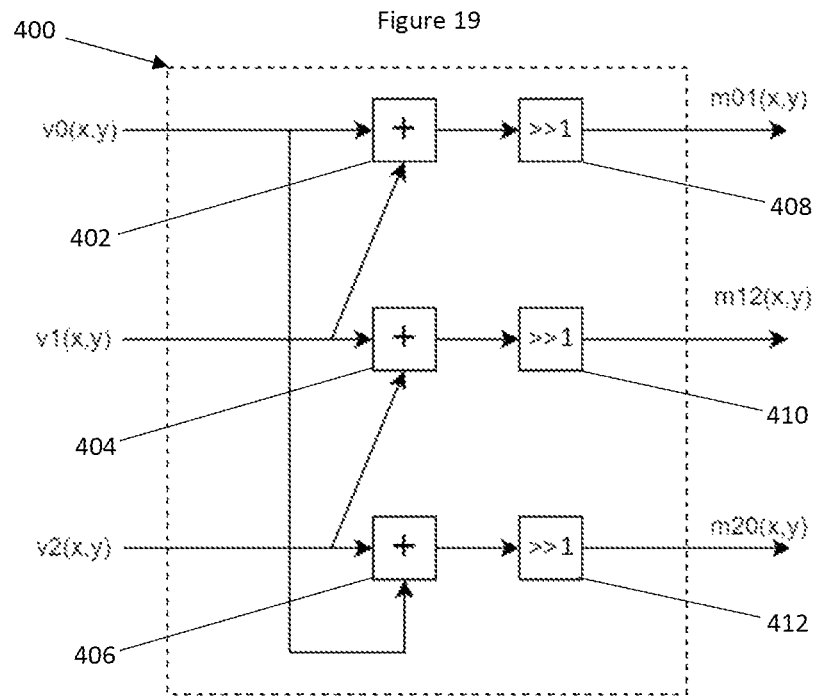
FIG. 19 is a schematic drawing of parts of a bounding box generation circuit in accordance with the technology described herein.

FIG. 19 shows a part-way point calculation circuit (400) comprising three addition elements (402, 404, 406). Each addition element (402, 404, 406) takes two pairs of x, y coordinates as inputs. Each addition element (402, 404, 406) adds together the x-coordinates and y-coordinates it took as input and outputs the results to one of three shifting elements (408, 410, 412). Each shifting element (408, 410, 412) performs a shifting operation, which may be an arithmetic shift, to effectively divide the output coordinates it received from the addition element (402, 404, 406) by a value proportional to the size of the shift.

In an embodiment, the arithmetic shift is by 1, which divides the x-coordinate and y-coordinate the shifting element received by 2. In other words, in this embodiment, this part-way point calculation circuit (400) calculates a mid-point m01(x,y) between points defined by coordinates v0(x, y) and v1(x,y), a mid-point m12(x,y) between points defined by coordinates v1(x,y) and v2(x,y), and a mid-point m02(x, y) between points defined by coordinates v0(x,y) and v2(x, y). Other part-way points other than mid-points can be calculated in other embodiments.

In an embodiment, the coordinates v0, v1, and v2 each correspond to vertices of a triangle primitive. The coordinates m01, m12, and m02 therefore correspond to mid-points along edges of the triangle primitive.

In another embodiment, a part-way point calculation circuit (400) may instead perform an arithmetic shift by 2, the result of which is a set of three part-way points being quarter-points between pairs of coordinates v0, v1, and v2. Other embodiments within the scope of the present technology include performing arithmetic shifts by values greater than 2 to obtain eighth-points, and so on.

In other embodiments, a part-way point calculation circuit (400) may be linearly extended to take more than three inputs, such as for calculating part-way points for rectangular primitives (4 inputs), and so on. In the case of four inputs, there will be four addition elements, four shifting elements, and four outputs rather than the three of each shown in FIG. 19.

In other embodiments, when using floating point numbers, a division by, for example, 2 can be realized by subtracting 1 from an exponent of a floating point number. Part-way point calculation circuits of these embodiments may then include subtracting elements for subtracting 1 (or greater numbers for corresponding power of two divisions) rather than the shifting elements (408, 410, 412) of FIG. 19. In such embodiments, the output values may be adjusted, such as by appropriate rounding, to place the output coordinates outside of the primitive to reduce the likelihood of any issues relating to floating point accuracy.

Referring to FIGS. 20 to 29, further embodiments of bounding box generation circuitry will now be described.

Figure 20:
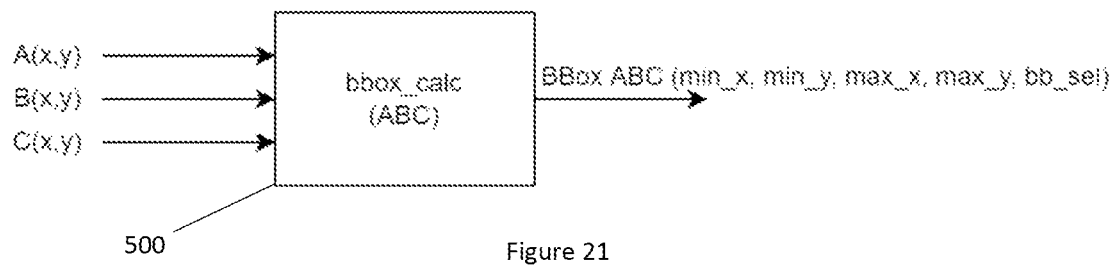
FIG. 20 is a schematic drawing of a part of a bounding box generation circuit in accordance with the technology described herein.

In FIG. 20, a bounding box calculation circuit (500) is shown taking three inputs A(x,y), B(x,y), and C(x,y) and outputting bounding box (BBox) "ABC" having coordinates (min_x, min_y, max_x, max_y), and an indication signal (bb_sel) to indicate whether further stages of a pipeline are to be disabled to save unnecessary computational expense. The bounding box calculation circuit (500) can therefore be seen to be substantially identical to the bounding box calculation circuit (300) described above with reference to FIG. 18. If the indication signal indicates that the bounding box calculated by the bounding box calculation circuit (500) primitive is entirely contained within a single tile, then, in an embodiment, subsequent stages of calculating part-way points and bounding boxes are disabled.

Figure 21:
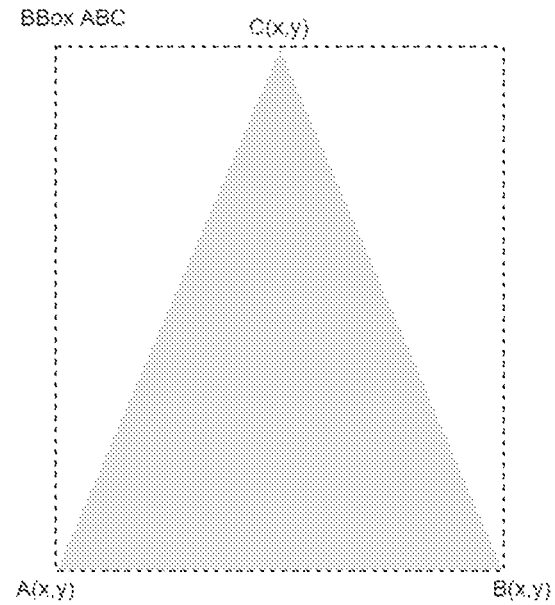
FIG. 21 shows an example bounding box of a primitive generated using embodiments of the technology described herein.

FIG. 21 shows a triangle primitive with vertices at coordinates A(x,y), B(x,y), and C(x,y). A bounding box BBox ABC, generated by the bounding box calculation circuit, is also shown.

Figure 22:
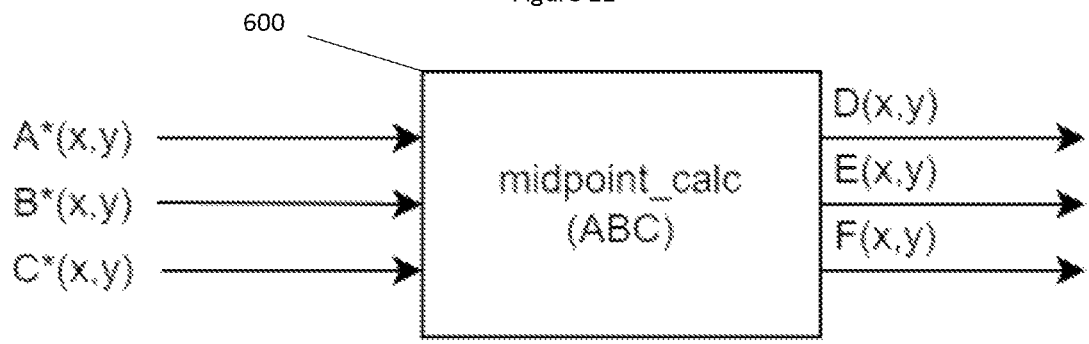
FIG. 22 is a schematic drawing of a part of a bounding box generation circuit in accordance with the technology described herein.

FIG. 22 shows a part-way point calculation circuit, in this embodiment taking the form of a mid-point calculation circuit (600), which takes as input the previously-used coordinates A(x,y), B(x,y), and C(x,y) and outputs mid-point coordinates D(x,y), E(x,y), and F(x,y). The mid-point calculation circuit (600) can be seen to be substantially identical to the part-way point calculation circuit (400) described above with reference to FIG. 19. The single asterisks of FIG. 22 indicate that those coordinates are taken as pipeline copies from a previous stage, such as the stage of calculating BBox ABC, described above with reference to FIGS. 20 and 21.

Figure 23:
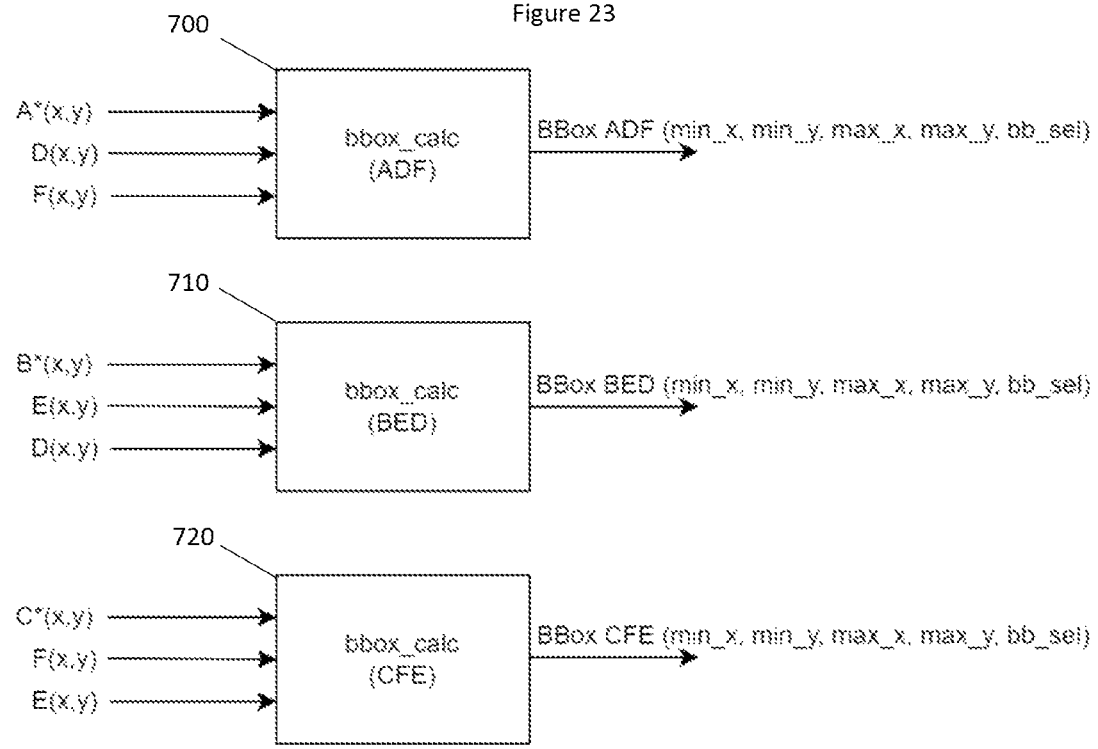
FIG. 23 is a schematic drawing of parts of a bounding box generation circuit in accordance with the technology described herein.
Figure 24:
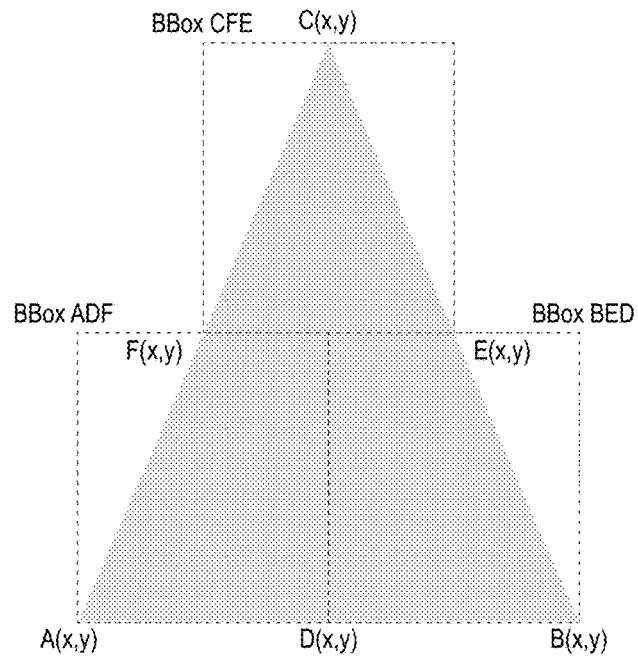
FIG. 24 shows bounding boxes for a primitive generated in accordance with the technology described herein.

FIG. 23 shows three bounding box calculation circuits (700, 710, 720) each taking three pairs of coordinates as inputs. Each bounding box calculation circuit (700, 710, 720) operates substantially identically to the bounding box calculation circuit (300) described above with reference to FIG. 18. Each bounding box calculation circuit (700, 710, 720) of this embodiment takes coordinates of a vertex of a primitive as one of its inputs, and coordinates of two mid-points calculated by a mid-point calculation circuit (600) as its other two inputs. For example, a bounding box calculation circuit (700) shown takes vertex coordinates A(x,y) and mid-point coordinates D(x,y) and F(x,y) and generates bounding box BBox ADF, which can be seen in FIG. 24. Similarly, the other bounding box calculation circuits (710, 720) of FIG. 23 generate bounding boxes BBox CFE and BBox BED, also shown in FIG. 24. In this way, bounding boxes (ADF, BED, and CFE) for the triangle primitive are generated which encompass the whole primitive and which can be generated in parallel with one another.

In an embodiment, one or more indication signals bb_sel are set to 0 to indicate that the corresponding bounding box(es) is/are to be split further. Bounding boxes to remain unsplit are so indicated by an indication signal bb_sel set to 1, which disables further splitting of those bounding boxes.

In embodiments where further splitting of one or more bounding boxes is required, circuits of FIGS. 25 to 28 are utilized as follows.

Figure 25:
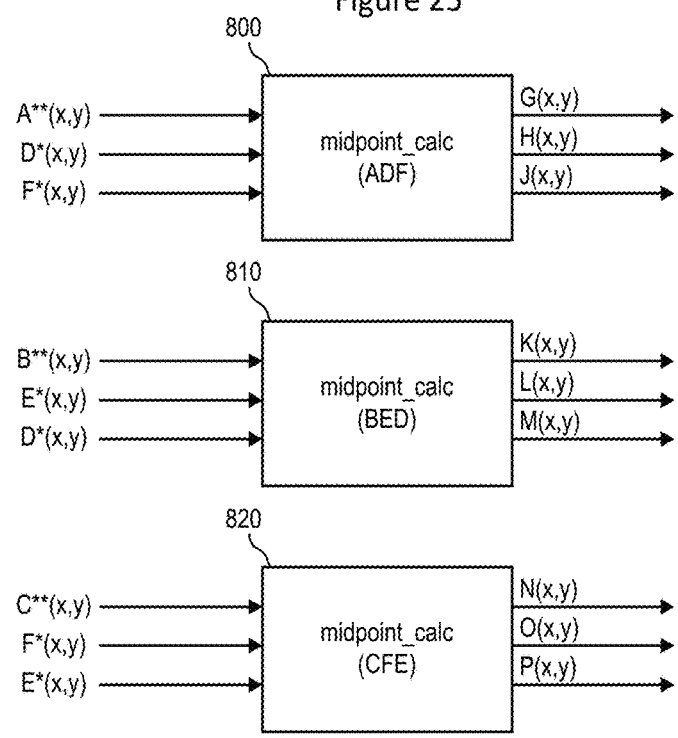
FIG. 25 is a schematic drawing of parts of a bounding box generation circuit in accordance with the technology described herein.

FIG. 25 shows three part-way point calculation circuits, in this embodiment taking the form of mid-point calculation circuits (800, 810, 820), which take as inputs coordinates of a vertex and coordinates of two mid-points, and output coordinates of points which are mid-way between each pair of inputs. For example, and with reference to FIG. 29, which shows an ultimate result of this embodiment, a mid-point calculation circuit (800) takes as inputs vertex coordinates A(x,y), where the double asterisk indicates that the coordinates were generated two stages prior and a pipeline copy is used, and mid-point coordinates D(x,y) and F(x,y). The mid-point calculation circuit (800) outputs coordinates of quarter-points G(x,y) and J(x,y), which lie mid-way between vertex A(x,y) and mid-points D(x,y), and F(x,y) respectively on edges of the primitive, and part-way point H(x,y), mid-way between mid-points D(x,y) and F(x,y) and inside the primitive. The other mid-point calculation circuits (810, 820) of FIG. 25 operate in substantially identical ways to output the other quarter-points (N, P, K, M) and part-way points (O and L) shown in FIG. 29.

Figure 26:
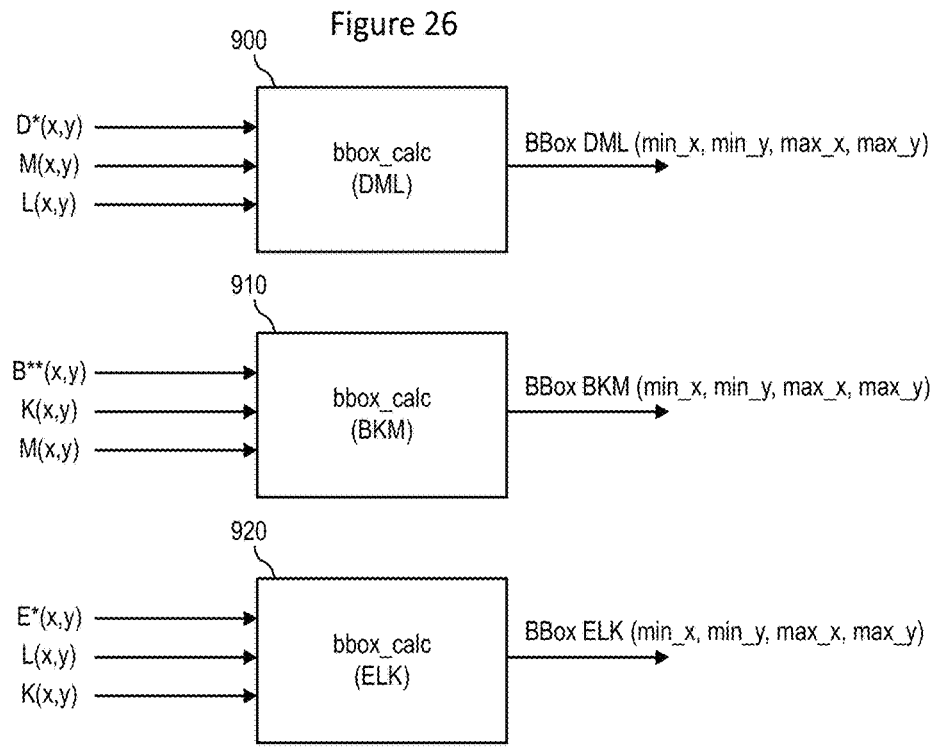
FIG. 26 is a schematic drawing of parts of a bounding box generation circuit in accordance with the technology described herein.
Figure 27:
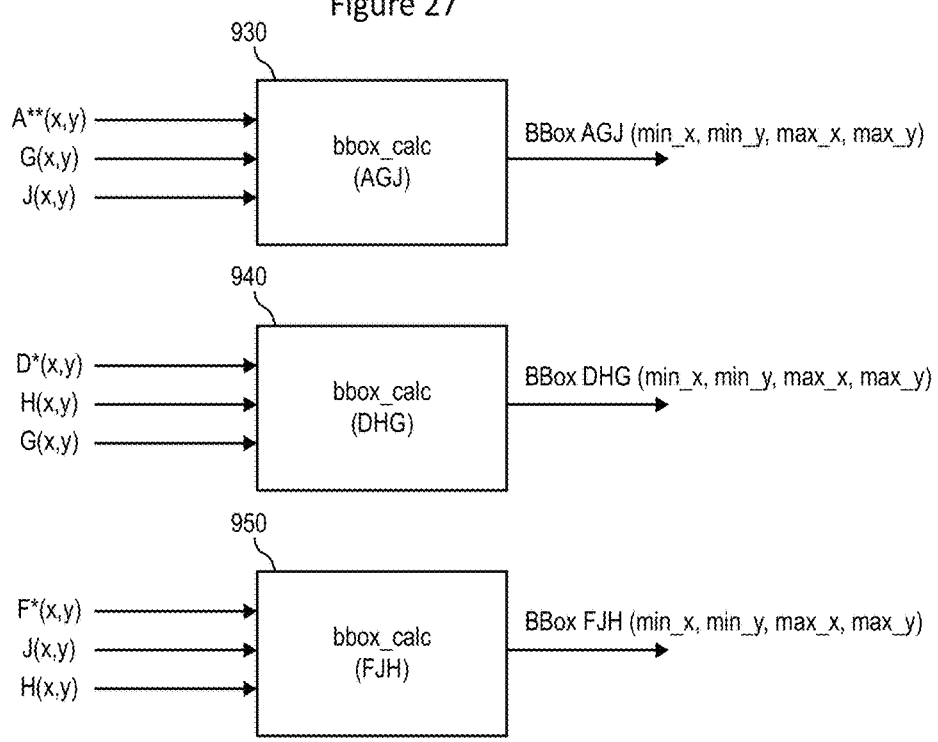
FIG. 27 is a schematic drawing of parts of a bounding box generation circuit in accordance with the technology described herein.
Figure 28:
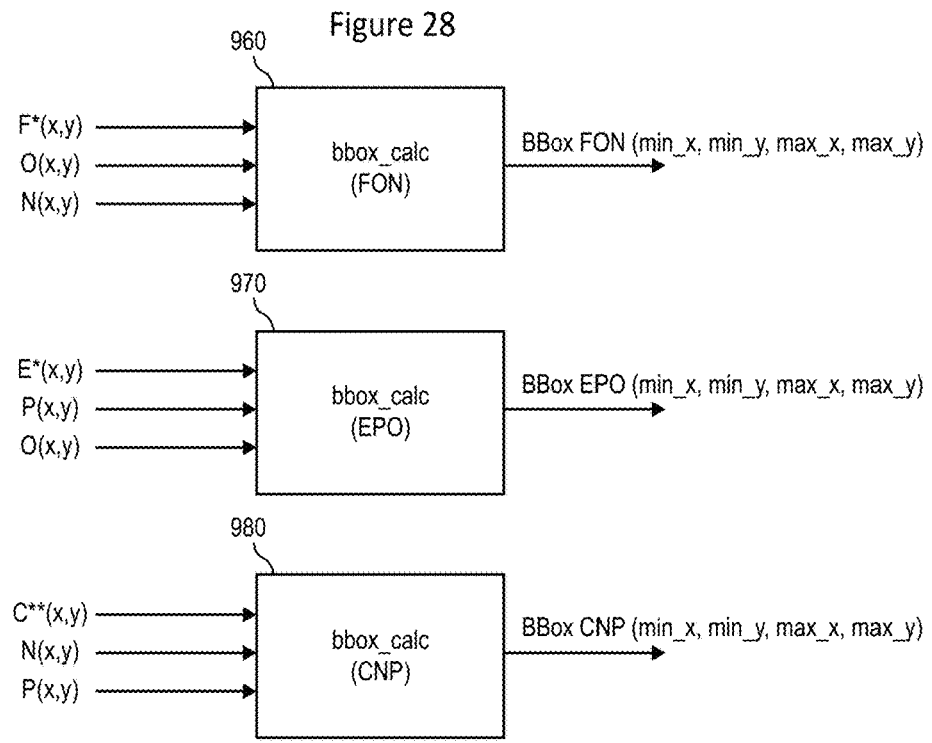
FIG. 28 is a schematic drawing of parts of a bounding box generation circuit in accordance with the technology described herein.

FIGS. 26 to 28 each show three bounding box calculation circuits (900, 910, 920; 930, 940, 950; 960, 970, 980) which take three coordinate pairs as inputs and output coordinates of corresponding bounding boxes.

Figure 29:
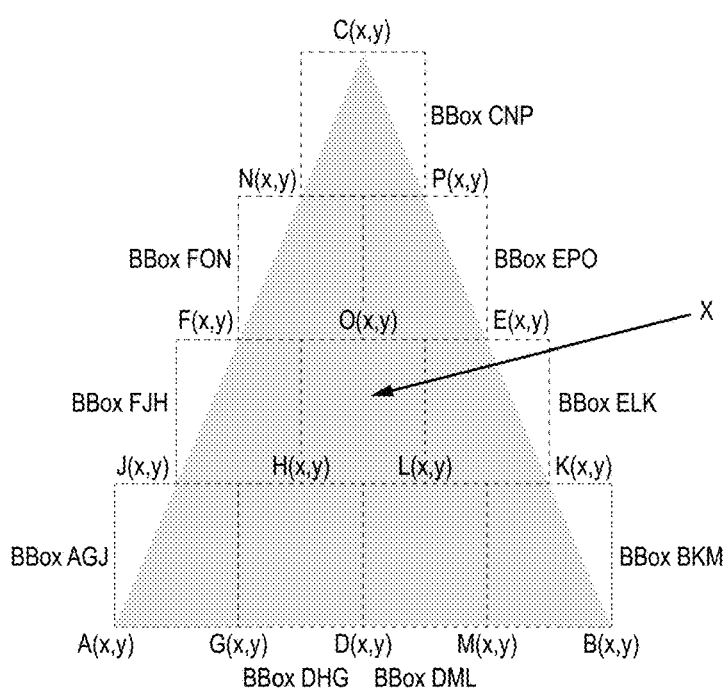
FIG. 29 shows bounding boxes for a primitive generated in accordance with the technology described herein.

Each vertex A, B, C of the primitive of FIG. 29 has associated with it two closest quarter-points on edges of the primitive. For instance, vertex A has associated with it quarter-points G and J. A bounding box for these three points is calculated by the first bounding box calculation circuit (930) of FIG. 27. Bounding box calculation circuits for bounding boxes associated with other vertices B and C are shown in FIGS. 26 (910) and 28 (980).

Each mid-point D, E, F of the primitive of FIG. 29 has associated with it two closest quarter-points on edges of the primitive and two closest part-way points which fall within the primitive rather than on its edge. For example, mid-point D has associated with it quarter-points G and M and part-way points H and L. Two corresponding bounding boxes are therefore to be generated: one for triangle DHG and one for triangle DML. The bounding box calculation circuits which calculate bounding box coordinates for triangles DML and DHG are shown in FIGS. 26 (900) and 27 (940) respectively. Bounding box calculation circuits for bounding boxes associated with other mid-points E and F are shown in FIGS. 26 (920), 27 (950), and 28 (960, 970).

In an embodiment, a bounding box generation circuit includes three part-way point calculation circuits (800, 810, 820) running in parallel to calculate coordinates of mid-points D, E, and F, and nine bounding box calculation circuits (900, 910, 920; 930, 940, 950; 960, 970, 980) running in parallel to calculate coordinate of bounding boxes ADF, BED and so on. Each bounding box calculation by a bounding box calculation circuit (900, 910, 920; 930, 940, 950; 960, 970, 980) takes coordinates of one existing point and coordinates of two points newly generated at the current stage of calculation as explained above.

Referring to FIG. 29, nine bounding boxes (AGJ, DHG, DML, BKM, ELK, CNP, FON, and FJH) are shown as the outcome of operating a bounding box generation circuit as described in embodiments above. Note region X in the center of the primitive which is not technically encompassed by a bounding box but, by virtue of being surrounded by (in this case, six of) the nine generated bounding boxes, is also considered to be part of the primitive during later graphics processing pipeline stages, such as binning and/or iteration.

A graphics processing apparatus embodying the present technology includes a processing element and a memory. A processing element may include, for example, a central processor unit (CPU), graphics processor unit (GPU), a system-on-chip, an application specific integrated circuit (ASIC), a neural processing unit (NPU), a DSP (digital signal processor), or the like. The processing element may comprise and/or be in communication with a storage system. The memory may include volatile memory (e.g. SRAM, DRAM, etc.) and/or non-volatile memory (e.g. flash memory, non-volatile RAM, etc.). The apparatus may include more than one processor. The apparatus may include more than one memory. The apparatus may comprise graphics output hardware for outputting graphics data to a display, a screen, or a monitor, which may be integral to the apparatus or separate therefrom. The memory stores computer program code which, when executed by the processing element, causes the apparatus to perform a method embodying the invention as described above.

The graphics processing apparatus may include dedicated logic hardware for each bounding box for best performance. Additionally, or alternatively, logic hardware may be reused. Additionally, or alternatively, the number of bounding boxes of an embodiment may be defined dynamically, such as by being defined differently for different primitives of a plurality of primitives.

In an embodiment, the graphics processing apparatus includes a bounding box generation circuit as described above.

The method embodiments described herein may include an initial step of computing a single, rectangular bounding box encompassing a primitive, and determining whether the height and/or the width of the single box equals or is less than a tile size. If the height and/or the width of the single box equals or is less than a tile size, then the method may stop for that primitive, and otherwise, continuing to determine a number of smaller bounding boxes according to an embodiment described herein.

Herein, exemplary embodiments relate to point primitives, line primitives, triangle primitives, and rectangular bounding boxes, but it is evident to one skilled in the art that other embodiments are possible within the scope of this application which apply to primitives and bounding boxes having other shapes.

As will be appreciated by one skilled in the art, the present techniques may be embodied as a method, a bounding box generation circuit, a computer program product, an apparatus, or a system. Accordingly, the present techniques may take the form of an entirely hardware embodiment, an entirely software embodiment, or an embodiment combining software and hardware.

Furthermore, the present techniques may take the form of a computer program product embodied in a computer readable medium having computer readable program code embodied thereon. The computer readable medium may be a computer readable signal medium or a computer readable storage medium. The computer readable storage medium may be a non-transitory computer readable storage medium encoded with instructions that, when performed by a processing means, cause performance of the method described above. A computer readable medium may be, for example, but is not limited to, an electronic, magnetic, optical, electromagnetic, infrared, or semiconductor system, apparatus, or device, or any suitable combination of the foregoing.

Computer program code for carrying out operations of the present techniques may be written in any combination of one or more programming languages, including object-oriented programming languages and conventional procedural programming languages.

For example, program code for carrying out operations of the present techniques may comprise source, object, or executable code in a conventional programming language (interpreted or compiled) such as C, or assembly code, code for setting up or controlling an ASIC (Application Specific Integrated Circuit) or FPGA (Field Programmable Gate Array), or code for a hardware description language such as Verilog™, SystemVerilog, or VHDL (Very high speed integrated circuit Hardware Description Language).

The program code may execute entirely on the user's computer, partly on the user's computer and partly on a remote computer or entirely on the remote computer or server. In the latter scenario, the remote computer may be connected to the user's computer through any type of network. Code components may be embodied as procedures, methods, or the like, and may comprise sub-components which may take the form of instructions or sequences of instructions at any of the levels of abstraction, from the direct machine instructions of a native instruction set to high-level compiled or interpreted language constructs.

It will also be clear to one of skill in the art that all or part of a logical method according to the preferred embodiments of the present techniques may suitably be embodied in a logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In one alternative, an embodiment of the present techniques may be realized in the form of a computer implemented method of deploying a service comprising steps of deploying computer program code operable to, when deployed into a computer infrastructure or network and executed thereon, cause said computer system or network to perform all the steps of the method. In a further alternative, the preferred embodiment of the present techniques may be realized in the form of a data carrier having functional data thereon, said functional data comprising functional computer data structures to, when loaded into a computer system or network and operated upon thereby, enable said computer system to perform all the steps of the method.

It will be clear to one skilled in the art that many improvements and modifications can be made to the foregoing exemplary embodiments without departing from the scope of the present techniques.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

The invention claimed is:

1. A computer-implemented method of defining bounding boxes for a primitive in a tile-based graphics processing pipeline, the primitive comprising a plurality of vertices, the method comprising:
   determining at least one part-way point on the primitive, wherein, for each pair of vertices, at least one of the part-way points is part-way between that pair of vertices; and
   defining a plurality of bounding boxes, wherein each bounding box intersects at least one of the part-way points.

2. The method of claim 1, further comprising determining which frame regions of a frame contain at least a portion of at least one bounding box.

3. The method of claim 2, further comprising outputting, to a memory, the frame regions determined to contain at least a portion of at least one bounding box.

4. The method of claim 1, wherein at least one part-way point is a mid-point.

5. The method of claim 1, wherein at least one part-way point is a quarter-point.

6. The method of claim 1, wherein at least one part-way point is a point at a predetermined distance from either a vertex.

7. The method of claim 1, wherein the primitive comprises a plurality of vertices, and calculating mid-points between each pair of vertices.

8. The method of claim 7, further comprising:
   determining at least one quarter-point halfway between a vertex and a mid-point.

9. The method of claim 8, further comprising defining at least one bounding box which intersects a quarter-point.

10. The method of claim 7, further comprising:
    determining a mid-point of a mid-point joining line which joins two mid-points of the perimeter.

11. The method of claim 10, further comprising defining at least one bounding box which intersects the mid-point of the mid-point joining line.

12. The method of claim 1, wherein the primitive is a line comprising two end-points.

13. A bounding box generation circuit to determine bounding boxes for a primitive in a tile-based graphics processing pipeline, the bounding box generation circuit comprising:
    a part-way point calculation circuit to determine at least one part-way point on the primitive, wherein, for each pair of vertices, at least one of the part-way points is part-way between that pair of vertices,
    wherein the bounding box generation circuit to define a plurality of bounding boxes based upon the determined at least one part-way point, wherein each bounding box intersects at least one part-way point.

14. The bounding box generation circuit of claim 13, comprising:
    a first calculating element comprising:
      at least one first comparing element configured to compare at least two x-coordinates of a plurality of x-coordinates and to output a first comparing value; and
      at least one first multiplexing element configured to take as inputs the first comparing value and the plurality of x-coordinates, and to output a maximum and a minimum of the plurality of x-coordinates; and
    a second calculating element comprising:
      at least one first comparing element configured to compare at least two y-coordinates of a plurality of y-coordinates and to output a second comparing value; and
      at least one first multiplexing element configured to take as inputs the second comparing value and the plurality of y-coordinates, and to output a maximum and a minimum of the plurality of y-coordinates, and
    wherein the maximum and minimum x- and y-coordinates define opposite corners of at least one bounding box for the primitive.

15. The bounding box generation circuit of claim 13, further comprising at least one rounding element configured to round an output of a calculating element up or down to a nearest tile size.

16. The bounding box generation circuit of claim 15, further comprising four said rounding elements: a rounding element configured to round up an x-coordinate; a rounding element configured to round down an x-coordinate; a rounding element configured to round up a y-coordinate; and a rounding element configured to round down a y-coordinate.

17. The bounding box generation circuit of claim 13, wherein the part-way point calculation circuit comprises at least one addition element for adding two coordinates of a plurality of coordinates together.

18. The bounding box generation circuit of claim 13, wherein the part-way point calculation circuit further comprises at least one shifting element for arithmetically shifting an output of at least one addition element.

19. The bounding box generation circuit of claim 14, further comprising a checking element configured to check whether the maximum and minimum x- and y-coordinates lie within a single tile and, based on the outcome, to output an indication signal.

20. The bounding box generation circuit of claim 13, wherein the part-way point calculation circuit is configured to take coordinates of vertices of a primitive as inputs and to output mid-points between each pair of the three vertices.

21. The bounding box generation circuit of claim 14, wherein the first calculation elements and second calculations elements are each configured to take coordinates of a vertex and coordinates of two mid-points as inputs and to output coordinates defining opposite corners of a bounding box for that vertex and two mid-points.

22. The bounding box generation circuit of claim 14, comprising three said first calculation elements and three said second calculation elements.

23. The bounding box generation circuit of claim 22, further comprising three further part-way point calculation circuits, nine further first calculation elements, and nine further second calculation elements.

24. The bounding box generation circuit of claim 23, wherein the three further part-way point calculation circuits are each configured to take coordinates of a vertex of the primitive and coordinates of two mid-points as inputs and to output two quarter-points on edges of the primitive and a part-way point within the primitive.

25. The bounding box generation circuit of claim 24, wherein three of the nine further first calculation elements and three of the nine further second calculation elements are each configured to take coordinates of a vertex and coordinates of two quarter-points as inputs and to output coordinates defining opposite corners of a bounding box for that vertex and two quarter-points.

26. The bounding box generation circuit of claim 25, wherein six of the nine first calculation elements and three of the nine further second calculation elements are each configured to take coordinates of a quarter-point, a mid-point, and a part-way point within the primitive as inputs and to output coordinates defining opposite corners of a bounding box for that quarter-point, mid-point, and part-way point within the primitive.

27. A computer-implemented method of defining bounding boxes for a point primitive in a tile-based graphics processing pipeline, the method comprising:
  defining a first bounding box covering a first portion of the point primitive; and
  defining at least one further bounding box covering at least one further portion of the point primitive.

28. The method of claim 27, comprising defining three bounding boxes, and further comprising:
  calculating coordinates of a first of the three bounding boxes according to the following equations:

$x\text{min}=x-\text{size}/4, y\text{min}=y-\text{size}/2, x\text{max}=x+\text{size}/4; y\text{max}=y+\text{size}/2,$ calculating coordinates of a second of three bounding boxes according to the following equations:

$x\text{min}=x-\text{size}/2; y\text{min}=y-\text{size}/4; x\text{max}=x+\text{size}/2; y\text{max}=y+\text{size}/4;$ and calculating coordinates of a third of three bounding boxes according to the following equations:

$x\text{min}=x-\text{size}/2+\text{size}/16; y\text{min}=y-\text{size}/2+\text{size}/16; x\text{max}=x+\text{size}/2-\text{size}/16; y\text{max}=y+\text{size}/2-\text{size}/16.$

* * * * *